US011216961B2

(12) United States Patent
Safdarnejad et al.

(10) Patent No.: US 11,216,961 B2
(45) Date of Patent: *Jan. 4, 2022

(54) ALIGNING DIGITAL IMAGES BY SELECTIVELY APPLYING PIXEL-ADJUSTED-GYROSCOPE ALIGNMENT AND FEATURE-BASED ALIGNMENT MODELS

(71) Applicant: Adobe Inc., San Jose, CA (US)

(72) Inventors: Seyed Morteza Safdarnejad, San Jose, CA (US); Chih-Yao Hsieh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/004,996

(22) Filed: Aug. 27, 2020

(65) Prior Publication Data
US 2020/0394808 A1 Dec. 17, 2020

Related U.S. Application Data

(63) Continuation of application No. 16/133,380, filed on Sep. 17, 2018, now Pat. No. 10,783,649.

(51) Int. Cl.
*G06T 7/00* (2017.01)
*G06T 7/33* (2017.01)
*G06K 9/62* (2006.01)

(52) U.S. Cl.
CPC ............ *G06T 7/337* (2017.01); *G06K 9/6211* (2013.01); *G06T 7/344* (2017.01)

(58) Field of Classification Search
CPC ........ G06T 7/337; G06T 7/344; G06K 9/6211
See application file for complete search history.

(56) References Cited

U.S. PATENT DOCUMENTS 9,055,218 B2  6/2015 Nishiyama et al.
10,783,649 B2 * 9/2020 Safdarnejad ......... G06K 9/4671
(Continued)

OTHER PUBLICATIONS

Konstantinos G. Derpanis; "Overview of the RANSAC Algorithm" Image Rochester NY 4, 1, May 13, 2010.
(Continued)

*Primary Examiner* — Khai M Nguyen
(74) *Attorney, Agent, or Firm* — Keller Jolley Preece

(57) ABSTRACT

This disclosure relates to methods, non-transitory computer readable media, and systems that analyze feature points of digital images to selectively apply a pixel-adjusted-gyroscope-alignment model and a feature-based-alignment model to align the digital images. For instance, the disclosed systems can select an appropriate alignment model based on feature-point-deficiency metrics specific to an input image and reference-input image. Moreover, in certain implementations, the pixel-adjusted-gyroscope-alignment model utilizes parameters from pixel-based alignment and gyroscope-based alignment to align such digital images. Together with the feature-based-alignment model, the disclosed methods, non-transitory computer readable media, and systems can use a selective image-alignment algorithm that improves computational efficiency, accuracy, and flexibility in generating enhanced digital images from a set of input images.

20 Claims, 10 Drawing Sheets

(56) References Cited

U.S. PATENT DOCUMENTS

| | | | | |
|---|---|---|---|---|
| 2008/0166115 | A1* | 7/2008 | Sachs | G03B 17/00 |
| | | | | 396/55 |
| 2011/0170784 | A1* | 7/2011 | Tanaka | G06T 7/33 |
| | | | | 382/195 |
| 2013/0195351 | A1* | 8/2013 | Hamada | G06T 11/00 |
| | | | | 382/159 |
| 2015/0116353 | A1* | 4/2015 | Miura | G06F 3/04845 |
| | | | | 345/632 |
| 2016/0247288 | A1 | 8/2016 | Omori et al. | |
| 2017/0206694 | A1 | 7/2017 | Jiao et al. | |
| 2017/0230577 | A1 | 8/2017 | Ishii | |
| 2018/0158199 | A1* | 6/2018 | Wang | G06K 9/6202 |
| 2018/0352165 | A1* | 12/2018 | Zhen | H04N 5/23229 |
| 2019/0026956 | A1* | 1/2019 | Gausebeck | H04N 13/10 |
| 2020/0077022 | A1* | 3/2020 | Lustig | H04N 5/23267 |
| 2020/0090351 | A1* | 3/2020 | Safdarnejad | G06K 9/4671 |
| 2020/0106945 | A1* | 4/2020 | Hsieh | H04N 5/2354 |
| 2020/0151860 | A1* | 5/2020 | Safdarnejad | G06T 5/50 |

OTHER PUBLICATIONS

Richard Szeliski, "Image Alignment and Stitching: A Tutorial," Foundations and Trends in Computer Graphics and Vision, vol. 2, No. 1 (2006).

Richard Hartley and Andrew Zisserman, Multiple View Geometry in Computer Vision, Ch. 8 (2d ed. 2004).

Zhaowei Li and David R. Selviah "Comparison of Image Alignment Algorithms," Proceedings Paper, London Communications Symposium, University College London, Sep. 8, 2011.

Ethan Rublee; Vincent Rabaud; Kurt Konolige; Gary Bradski; "ORB: an efficient alternative to SIFT or SURF," Proceedings of the IEEE International Conference on Computer Vision. 2564-2571. 10.1109/ICCV.2011.6126544.

Image Alignment and Stitching: A Tutorial; Richard Szeliski (Year: 2006).

U.S. Appl. No. 16/133,380, Feb. 7, 2020, Preinterview 1st Office Action.

U.S. Appl. No. 16/133,380, May 18, 2020, Notice of Allowance.

\* cited by examiner

ALIGNING DIGITAL IMAGES BY SELECTIVELY APPLYING PIXEL-ADJUSTED-GYROSCOPE ALIGNMENT AND FEATURE-BASED ALIGNMENT MODELS

CROSS-REFERENCE TO RELATED APPLICATIONS

The present application is a continuation of U.S. application Ser. No. 16/133,380, filed on Sep. 17, 2018. The aforementioned application is hereby incorporated by reference in its entirety.

BACKGROUND

Image-alignment systems currently use a variety of computer-vision algorithms to align one or more digital images with another digital image. By aligning one digital image with another digital image, an image-alignment system may, for example, stitch images together to create a panoramic image or generate a range of other modified digital images. Image-alignment systems employ computer vision to apply variations of common image-alignment algorithms to align such digital images. For instance, a conventional system may use key-point-based alignment or pixel-based alignment. As explained below, both key-point-based alignment and pixel-based alignment have a number of technical shortcomings that limit the accuracy, efficiency, and flexibility with which a conventional image-alignment system can align digital images.

In key-point-based alignment, for example, a conventional image-alignment system generally extracts and matches key points within digital images to align one digital image with another digital image. By matching key points between digital images, the image-alignment system can calculate parametric models that align images. But conventional image-alignment systems that use key-point-based alignment often cannot align digital images. For instance, an image-alignment system applying key-point-based alignment frequently fails to align digital images that include poor illumination, moving objects, or texture-less content, to name but a few examples. For example, with regard to texture-less content, a key-point-based alignment may fail to detect enough key points in a digital image portraying the sky, sea water in motion, sand, or other scenes including a non-discriminative pattern.

In pixel-based alignment, by contrast, a conventional image-alignment system generally involves a pixel-by-pixel comparison across digital images. By comparing and aligning all pixels, the image-alignment system can calculate factors that would align digital images based on pixels agreeing or overlapping between the images. Because conventional pixel-based alignment often involves searching a hierarchal sampling of pixels (or each constituent pixel) within digital images, this conventional image-alignment algorithm consumes a relatively large amount of processing power and can accordingly be computationally inefficient. Some conventional pixel-based alignments are particularly problematic for mobile devices with processors of more limited processing capacity.

SUMMARY

This disclosure describes one or more embodiments of methods, non-transitory computer readable media, and systems that solve the foregoing problems in addition to providing other benefits. For example, in some embodiments, the disclosed systems analyze feature points of digital images to select between a pixel-adjusted-gyroscope-alignment model and a feature-based-alignment model to align the digital images. In certain implementations, the pixel-adjusted-gyroscope-alignment model combines parameters from pixel-based alignment and gyroscope-based alignment to align such digital images. Together with the feature-based-alignment model, the disclosed systems can use a selective image-alignment algorithm that exploits the computational efficiency of a modified feature-based alignment and the accuracy of a pixel-based alignment—in addition to accuracy verification from gyroscope datasets of a computing device. Accordingly, the disclosed systems can provide efficient image alignment of digital images on various computing devices with gyroscopes (including mobile devices) with robustness to scene content, illumination variation, and foreground presence.

For instance, in some embodiments, the disclosed systems identify a first set of feature points within a reference-input image and a second set of feature points within an input image. Based on one or both of the first and second sets of feature points, the systems determine a feature-point-deficiency metric corresponding to a feature-based-alignment model for aligning the input image with the reference-input image. Based on the feature-point-deficiency metric, the systems select an image-alignment model from a pixel-adjusted-gyroscope-alignment model and the feature-based-alignment model. The systems subsequently apply the selected image-alignment model to the input image to align the input image with the reference-input image.

BRIEF DESCRIPTION OF THE DRAWINGS

The detailed description refers to the drawings briefly described below.

DETAILED DESCRIPTION

Figure 1:
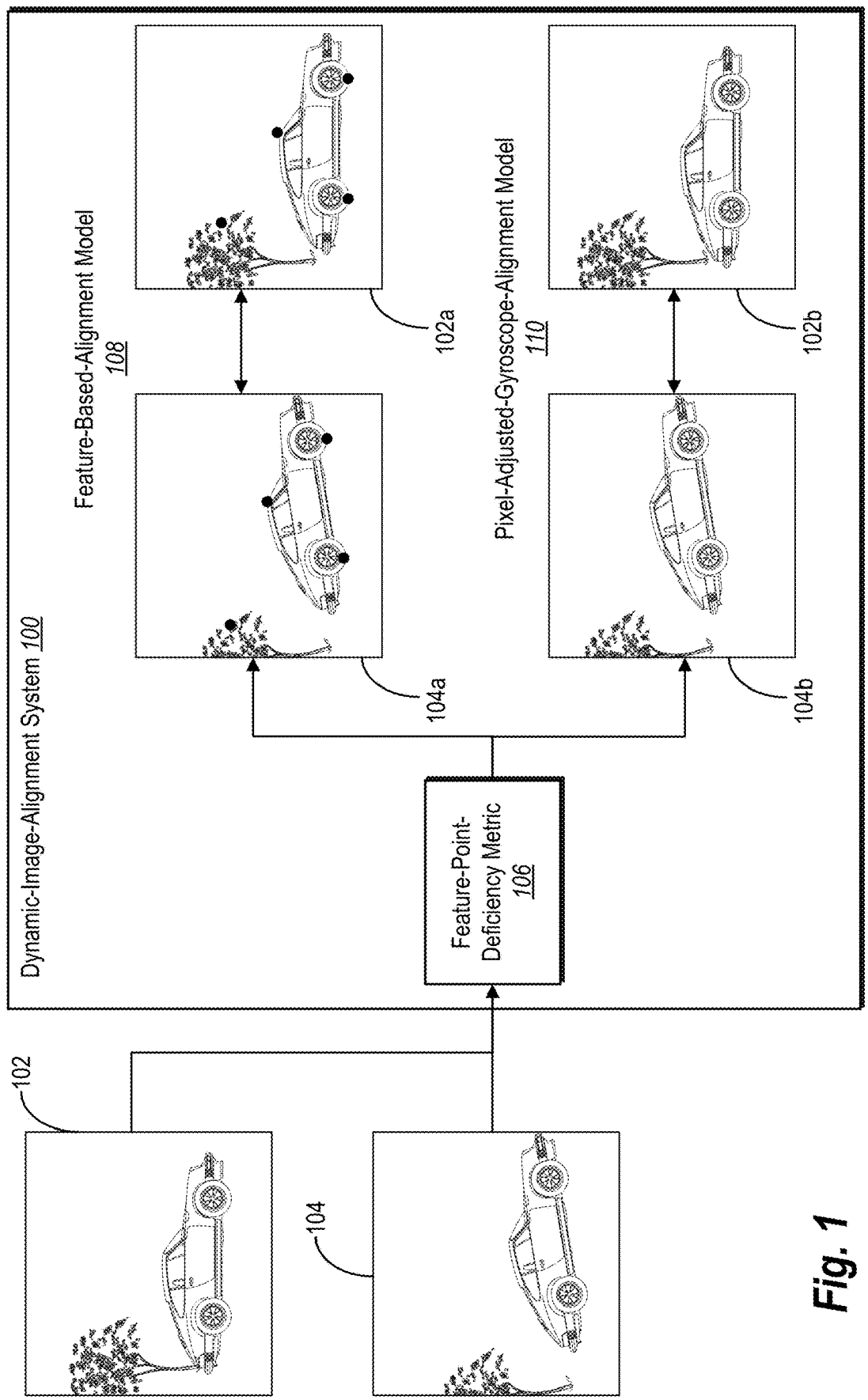
FIG. 1 illustrates a dynamic-image-alignment system aligning an input image with a reference-input image in accordance with one or more embodiments.

One or more embodiments described herein include a dynamic-image-alignment system that uses a feature-point-deficiency metric to select between a feature-based-alignment model and a pixel-adjusted-gyroscope-alignment model to align one or more input images with a reference-input image. Upon detecting a feature-point deficiency corresponding to a feature-based-alignment model, for example, the dynamic-image-alignment system applies the pixel-adjusted-gyroscope-alignment model to align an input image with a reference-input image. By contrast, upon determining an absence of a feature-point deficiency, the dynamic-image-alignment system can apply a feature-based-alignment model to align an input image with a reference-input image. By using a selective image-alignment algorithm, in some embodiments, the disclosed dynamic-image-alignment system exploits the computational efficiency of a modified feature-based alignment and the accuracy of a pixel-based alignment. The disclosed dynamic-image-alignment system can further add an accuracy verification to one or both of the selected image-alignment models based on gyroscope datasets of a mobile device.

As suggested above, in some embodiments, the dynamic-image-alignment system aligns one or more input images from a set of images with a reference image from the same set of images. For example, in certain cases, the dynamic-image-alignment system identifies a first set of feature points within a reference-input image and a second set of feature points within an input image. Based on one or both of the first and second sets of feature points, the dynamic-image-alignment system determines a feature-point-deficiency metric corresponding to a feature-based-alignment model for aligning the input image with the reference-input image. Based on the feature-point-deficiency metric, the disclosed dynamic-image-alignment system selects an image-alignment model from a pixel-adjusted-gyroscope-alignment model and the feature-based-alignment model. The dynamic-image-alignment system subsequently applies the selected image-alignment model to the input image to align the input image with the reference-input image. In some cases, the dynamic-image-alignment system continues aligning the set of images by selecting and applying an image-alignment model from the pixel-adjusted-gyroscope-alignment model and the feature-based-alignment model to align an additional input image from the set of images with the reference-input image.

As indicated above, in certain implementations, the dynamic-image-alignment system uses a feature-point-deficiency metric (and corresponding deficiency threshold) to determine whether a feature-point deficiency exists and to select an image-alignment model. When determining a feature-point-deficiency metric, for instance, the dynamic-image-alignment system can determine a number of feature points within the reference-input image and the input image. As a further example, the dynamic-image-alignment system can determine a number of matching feature points between the reference-input image and the input image. By contrast, the dynamic-image-alignment system can determine (as a feature-point-deficiency metric) whether feature-alignment parameters for the feature-based-alignment model would align the input image with the reference-input image. In some embodiments, the dynamic-image-alignment system determines such feature-point-deficiency metrics at different decision points of a selective image-alignment algorithm and—based on a metric and deficiency threshold at each decision point—determines whether to apply the pixel-adjusted-gyroscope-alignment model or the feature-based-alignment model.

As just mentioned, based on identifying a feature-point deficiency, the dynamic-image-alignment system can apply a pixel-adjusted-gyroscope-alignment model. For instance, in some embodiments, the dynamic-image-alignment system identifies a first gyroscope dataset corresponding to a reference-input image and a second gyroscope dataset corresponding to an input image. Based on the first and second gyroscope datasets—and (in some cases) a camera-intrinsic matrix reflecting image dimensions and/or camera focal length—the dynamic-image-alignment system generates gyroscope-alignment parameters for aligning the input image with the reference-input image. Upon detecting a feature-point deficiency, the dynamic-image-alignment system can generate pixel-adjusted-gyroscope-alignment parameters for aligning the input image with the reference-input image based on the gyroscope-alignment parameters and pixel comparison between the reference-input image and the input image. The dynamic-image-alignment system subsequently applies the pixel-adjusted-gyroscope-alignment parameters to the input image to align the input image with the reference-input image.

As noted above, in certain implementations, the dynamic-image-alignment system selects a feature-based-alignment model (instead of a pixel-adjusted-gyroscope-alignment model) based on detecting an absence of feature-point deficiencies corresponding to the feature-based-alignment model. In some such embodiments, the dynamic-image-alignment system identifies matching feature points between the reference-input image and the input image. The dynamic-image-alignment system then rectifies the matching feature points (e.g., by removing or filtering out certain matching feature points) based on gyroscope data (e.g., gyroscope-alignment parameters). In particular, the dynamic-image-alignment system can filter matching feature points that do not align the input image with the reference-input image in light of the gyroscope-alignment parameters. Based on the rectified/filtered set of matching feature points, the dynamic-image-alignment system estimates feature-alignment parameters and applies the feature-alignment parameters to the input image to align the input image with the reference-input image.

By selecting and applying an image-alignment model, the dynamic-image-alignment system can generate an enhanced digital image based on an input image aligned with a reference-input image. For example, in certain implementations, the dynamic-image-alignment system replaces an object portrayed in the reference-input image with an object portrayed in an aligned input image. By contrast, in some cases, the dynamic-image-alignment system generates a pixel blur based on the aligned input image and the reference-input image to simulate an extended exposure of a camera.

As suggested above, the dynamic-image-alignment system overcomes several technical deficiencies that hinder conventional image-alignment systems. First, the dynamicimage-alignment system improves the accuracy with which an image-alignment system aligns one digital image with another digital image in an efficient and selective approach to image alignment. The dynamic-image-alignment system improves accuracy by selecting an alignment model that is suited to the particular features of a reference-input image and input image. For example, the dynamic-image-alignment system can apply a pixel-adjusted-gyroscope-alignment model when such an image-alignment model would most accurately align an input image with a reference-input image based on the particular features of the reference-input image and the input image.

Second, both the pixel-adjusted-gyroscope-alignment model and feature-based-alignment model disclosed herein improve upon the efficacy of a conventional key-point-based alignment. For example, in some embodiments, the dynamic-image-alignment system uses both gyroscope-alignment parameters and estimated pixel-based-alignment parameters to create pixel-adjusted-gyroscope-alignment parameters that are more likely to align an input image with a reference-input image than a conventional key-point-based alignment. Such pixel-adjusted-gyroscope-alignment parameters account for texture and moving objects in digital images better than conventional feature-based alignment.

Additionally, or alternatively, in some embodiments, the dynamic-image-alignment system uses a feature-based-alignment model that rectifies matching feature points between a reference-input image and an input image based on gyroscope data to create a rectified/filtered set of matching feature points. Such a rectified/filtered set of matching feature points avoids inaccurate or outlier matching feature points that a conventional image-alignment system might erroneously produce.

Third, the dynamic-image-alignment system improves the efficiency and speed with which an image-alignment system aligns one digital image with another digital image while simultaneously performing an accurate image alignment. As mentioned above, the dynamic-image-alignment system can select an image-alignment model that improves computational efficiency based on the specific features of a reference-input image and input image (e.g., select a pixel-adjusted-gyroscope-alignment model only where a feature deficiency metric indicates the pixel-adjusted-gyroscope-alignment model is necessary).

Moreover, in some embodiments, the dynamic-image-alignment system employs a pixel-adjusted-gyroscope-alignment model that determines one or both of gyroscope-alignment parameters and estimated pixel-based-alignment parameters in a process that requires less computational processing than determining pixel-based-alignment parameters in conventional pixel-based alignment. By avoiding the computational processing required by conventional pixel-based alignment, in some embodiments, the dynamic-image-alignment system reduces the processing load of a computing device and expedites the speed of image alignment. As further suggested above, in some embodiments, the dynamic-image-alignment system reduces the computational processing by estimating pixel-based-alignment parameters that approximately align a warped input image with a reference-input image—and combining the estimated parameters with gyroscope-alignment parameters—to avoid the computational load of conventional pixel-based alignment.

Fourth, in certain embodiments, the dynamic-image-alignment system introduces a flexible and selective image-alignment algorithm that avoids the rigid application of conventional image-alignment algorithms. In contrast to some conventional image-alignment systems, the disclosed dynamic-image-alignment system uses a flexible approach that selects between a pixel-adjusted-gyroscope-alignment model and a feature-based-alignment model to align digital images. To select between two different image-alignment models, in some cases, the dynamic-image-alignment system uses a feature-point-deficiency metric at decision points of a selective image-alignment algorithm and avoids rigid application of a feature-based alignment when feature points within input images indicate such application would inaccurately align digital images. In addition to selecting one image-alignment model for a pair of an input image and a reference-input image, in some embodiments, the dynamic-image-alignment system demonstrates further flexibly by selecting a different image-alignment model for an additional input image from a same set of input images. By using a selective image-alignment algorithm that may select a different image-alignment model for multiple input images within a set of input images, the disclosed dynamic-image-alignment system introduces a dynamic approach to aligning multiple images to a reference-input image from the image set.

The dynamic-image-alignment system can also utilize feature-point-deficiency metrics in other ways to improve flexibility. For example, in one or more embodiments, the dynamic-image-alignment system can select a type of alignment estimation or transformation based on feature-point deficiency metrics. For example, if a threshold number of feature points are detected, the dynamic-image-alignment system can apply a homography transformation to represent the alignment parameters. If a threshold number of matching feature points are not detected, the dynamic-image-alignment system can apply an affine transformation.

Turning now to FIG. 1, this figure illustrates a dynamic-image-alignment system 100 selecting and applying either a feature-based-alignment model 108 or a pixel-adjusted-gyroscope-alignment model 110 to align an input image 104 with a reference-input image 102. As indicated by FIG. 1, the dynamic-image-alignment system 100 receives and identifies feature points of the reference-input image 102 and the input image 104. Based on one or more of the identified feature points, the dynamic-image-alignment system 100 determines a feature-point-deficiency metric 106 corresponding to the feature-based-alignment model 108. Based on the feature-point-deficiency metric 106, the dynamic-image-alignment system 100 further selects (and applies) an image-alignment model from the feature-based-alignment model 108 or the pixel-adjusted-gyroscope-alignment model 110.

As indicated by FIG. 1, the dynamic-image-alignment system 100 receives the reference-input image 102 and the input image 104 from a computing device. For instance, the dynamic-image-alignment system 100 may receive the reference-input image 102 and the input image 104 from a mobile device that uses a camera to capture both the reference-input image 102 and the input image 104. As used in this disclosure, the term "input image" refers to a digital image captured by a camera or a computing device. In some embodiments, an input image includes a digital image captured by a camera and received by (or input into) a dynamic-image-alignment system for alignment with another digital image. Accordingly, the dynamic-image-alignment system can align an input image with another input image. As suggested above, in some embodiments, an input image may be one of multiple input images that are part of a set. For example, a set of input images can comprise a series of photographs or scans of an object or scene captured by a camera or computing device.

Similarly, the term "reference-input image" refers to a digital image that is captured by a camera or a computing device and is used as a reference for aligning one or more input images. In some embodiments, a reference-input image includes an input image from a set of input images selected as a reference for aligning other input images within the set. As shown in FIG. 1, for instance, the dynamic-image-alignment system 100 selects the reference-input image 102 from a set of input images captured by a camera and aligns the input image 104 (and optionally other input images from the set) with the reference-input image 102.

After receiving the reference-input image 102 and the input image 104, the dynamic-image-alignment system 100 identifies a set of feature points within the reference-input image 102 and a set of feature points within the input image 104. As used in this disclosure, the term "feature point" refers to a point (e.g., an area or region) within a digital image indicating a feature of the image. In some embodiments, a feature point includes a point within a digital image detected by a feature detector (or key-point detector) that indicates a blob, corner, edge, ridge, or other feature within the image. For example, in certain implementations, the dynamic-image-alignment system 100 uses a Binary Robust Independent Elementary Features ("BRIEF") detection algorithm, a Features from Accelerated Segment Test ("FAST") detection algorithm, or an Oriented FAST and rotated BRIEF ("ORB") detection algorithm to detect a set of feature points within the reference-input image 102 and a set of feature points within the input image 104. But the dynamic-image-alignment system 100 may use any suitable detection algorithm to detect feature points, including, but not limited to, a Laplacian of Gaussian algorithm, a Principal Curvature-Based Region ("PCBR") algorithm, a Scale-Invariant Feature Transform ("SIFT") algorithm, a Speed up Robust Feature ("SURF") algorithm, or a Smallest Univalue Segment Assimilating Nucleus ("SUSAN") algorithm.

After detecting such feature points, in some implementations, the dynamic-image-alignment system 100 further extracts the detected feature points from the reference-input image 102 and the input image 104. For instance, the dynamic-image-alignment system 100 may detect and extract local image patches around each of a first set of feature points within the reference-input image 102 and local image patches around each of a second set of feature points within the input image 104. Upon extraction, each extracted feature point may be, for instance, in the form of a feature descriptor or feature vector. Accordingly, as indicated by this disclosure, a set of feature points may be represented as a feature vector.

As further shown in FIG. 1, the dynamic-image-alignment system 100 determines the feature-point-deficiency metric 106 based on one or both of a first set of feature points within the reference-input image 102 and a second set of feature points within the input image 104. As used in this disclosure, the term "feature-point deficiency" refers to a defect, failure, shortcoming, or insufficiency in one or more feature points or feature-alignment parameters (e.g., with reference to gyroscope datasets or gyroscope-alignment parameters). In some embodiments, a feature-point deficiency includes a qualitative defect or quantitative insufficiency in a set of feature points corresponding to a feature-based-alignment model. For example, in certain implementations, the dynamic-image-alignment system 100 detects a feature-point deficiency by determining that a set of feature points within a reference-input image (or within an input image) do not satisfy a threshold amount of feature points. As another example, in some cases, the dynamic-image-alignment system 100 detects a feature-point deficiency by determining that matching feature points between a reference-input image and an input image do not satisfy a threshold amount of matching feature points. In a further example, the dynamic-image-alignment system 100 detects a feature-point deficiency by determining that feature-alignment parameters corresponding to the feature-based-alignment model would not reasonably align an input image with a reference-input image based on a comparison with (or reference to) gyroscope datasets or gyroscope-alignment parameters.

Similar to the term feature-point deficiency, the term "feature-point-deficiency metric" refers to a measurement of one or more feature points within an input image indicating a presence or absence of a feature-point deficiency. In some embodiments, a feature-point-deficiency metric comprises a quantitative indicator that a set of feature points or feature-alignment parameters include (or do not include) a feature-point deficiency. For example, in certain implementations, the dynamic-image-alignment system 100 determines a feature-point-deficiency metric by determining a number of feature points in a set of feature points within a reference-input image and/or a number of feature points within a set of feature points within an input image. As another example, in certain implementations, the dynamic-image-alignment system 100 determines a feature-point-deficiency metric by determining a number of matching feature points between a reference-input image and an input image. As a further example, the dynamic-image-alignment system 100 can determine a feature-point-deficiency metric by identifying unusual or unreasonable feature-alignment parameters. For instance, the dynamic-image-alignment system 100 can determine a differential between feature-alignment parameters and a range of expected feature-alignment parameters for an input image (e.g., a range comprising maximum and minimum expected feature-alignment parameters). Accordingly, the feature-point-deficiency metric 106 shown in FIG. 1 may constitute any of the foregoing or other examples in this disclosure.

As further shown in FIG. 1, based on the feature-point-deficiency metric 106, the dynamic-image-alignment system 100 selects (and applies) an image-alignment model from the feature-based-alignment model 108 or the pixel-adjusted-gyroscope-alignment model 110. As used in this disclosure, the term "feature-based-alignment model" refers to an image-alignment model that aligns an input image with a reference-input image based on feature points within the input image and the reference-input image. In some embodiments, a feature-based-alignment model includes an algorithm that identifies and matches feature points between an input image and a reference-input image to align the input image with the reference-input image. For instance, in some embodiments, the dynamic-image-alignment system 100 applies a feature-based-alignment model by executing a Random Sample Consensus ("RANSAC") algorithm, Least Median of Square ("LMedS") regression algorithm, or other suitable robust-model estimation algorithms to generate feature-alignment parameters and align an input image with a reference-input image based on the feature-alignment parameters. This disclosure further describes a feature-based-alignment model with reference to FIGS. 2 and 4 below.

The term "feature-alignment parameters" refers to one or more factors that relate feature points from one digital image to corresponding feature points from another digital image.

In some embodiments, for instance, feature-alignment parameters include factors that, when applied to a first digital image, align the first digital image with a second digital image based on matching feature points between the first and second digital images. Feature-alignment parameters may be homography-transformation parameters or affine-transformation parameters. Accordingly, in some embodiments, the dynamic-image-alignment system 100 uses feature-alignment parameters expressed as a matrix relating matching feature points.

As further used in this disclosure, the term "pixel-adjusted-gyroscope-alignment model" refers to an image-alignment model that aligns a digital image with another digital image based on gyroscope datasets corresponding to the digital images and pixel-to-pixel comparison between the digital images. In some embodiments, a pixel-adjusted-gyroscope-alignment model comprises an image-alignment algorithm that aligns an input image with a reference-input image based on pixel-based-alignment parameters and gyroscope-alignment parameters. In some such cases, the dynamic-image-alignment system 100 uses pixel-based-alignment parameters to adjust or modify gyroscope-alignment parameters. This disclosure further describes a pixel-adjusted-gyroscope-alignment model with reference to FIGS. 2 and 3 below.

Relatedly, the term "pixel-adjusted-gyroscope-alignment parameters" refers to one or more indicators that relate an input image to a reference-input image based on gyroscope data and individual-pixel comparison between the input image and the reference-input image. In some embodiments, for instance, pixel-adjusted-gyroscope-alignment parameters include factors that, when applied to a first digital image, align a first digital image with a second digital image based on both pixel-based-alignment parameters and gyroscope-alignment parameters. Further, the term "gyroscope-alignment parameters" refers to one or more indicators that relate an input image to a reference-input image based on gyroscope datasets. For instance, gyroscope-alignment parameters include transformation parameters that relate a gyroscope dataset corresponding to one digital image to a gyroscope dataset corresponding to another digital image. In some embodiments, for instance, gyroscope-alignment parameters include a matrix that, when applied to a first digital image, align the first digital image with a second digital image based on a focal length of a camera and a relative rotation between the input image and the reference-input image indicated by gyroscope datasets corresponding to the first and second digital images. Both pixel-adjusted-gyroscope-alignment parameters and gyroscope-alignment parameters may be homography-transformation parameters or (in some cases) affine-transformation parameters. Accordingly, in some embodiments, the dynamic-image-alignment system 100 uses pixel-adjusted-gyroscope-alignment parameters or gyroscope-alignment parameters expressed as a matrix relating an input image and a reference-input image.

As suggested above, in some embodiments, the dynamic-image-alignment system 100 uses a pixel-based-alignment model (instead of a pixel-adjusted-gyroscope-alignment model) as an option for an image-alignment model from which to select. As used in this disclosure, the term "pixel-based-alignment model" refers to an image-alignment model that aligns a digital image with another digital image based on pixel-to-pixel comparison between the digital images. In some embodiments, a pixel-based-alignment model comprises pixel-by-pixel error analysis (e.g., sum of squared differences, sum of absolute differences, root mean squared intensity pixel error, normalized cross-correlation), hierarchical motion estimation, or Fourier-based alignment of digital images.

In one or more embodiments, the dynamic-image-alignment system 100 selects and applies only one of the feature-based-alignment model 108 or the pixel-adjusted-gyroscope-alignment model 110 for a given input image. FIG. 1, however, depicts both image-alignment models for illustrative purposes. In some embodiments, for instance, the dynamic-image-alignment system 100 applies the feature-based-alignment model 108 to align (i) an input image 104*a* comprising a set of feature points with (ii) a reference-input image 102*a* comprising a corresponding set of feature points. By contrast, in some embodiments, the dynamic-image-alignment system 100 applies the pixel-adjusted-gyroscope-alignment model 110 to perform a simplified pixel-by-pixel comparison of an input image 104*b* and a reference-input image 102*b* (guided by gyroscope data) to align the input image 104*b* to the reference input image 102*b*. In this manner, the dynamic-image-alignment system 100 can align the input image 104 and the reference-input image 102.

In the alternative to selecting an image-alignment model from a pixel-adjusted-gyroscope-alignment model and a feature-based-alignment model, in some embodiments, the dynamic-image-alignment system 100 uses a feature-point-deficiency metric to select between a pixel-based-alignment model (e.g., a model that does not utilize gyroscope data) and a feature-based-alignment model to align digital images. Accordingly, based on identifying a feature-point deficiency, in some cases, the dynamic-image-alignment system optionally applies a pixel-based-alignment model (instead of a feature-based-alignment model) to align an input image with a reference-input image.

Figure 2:
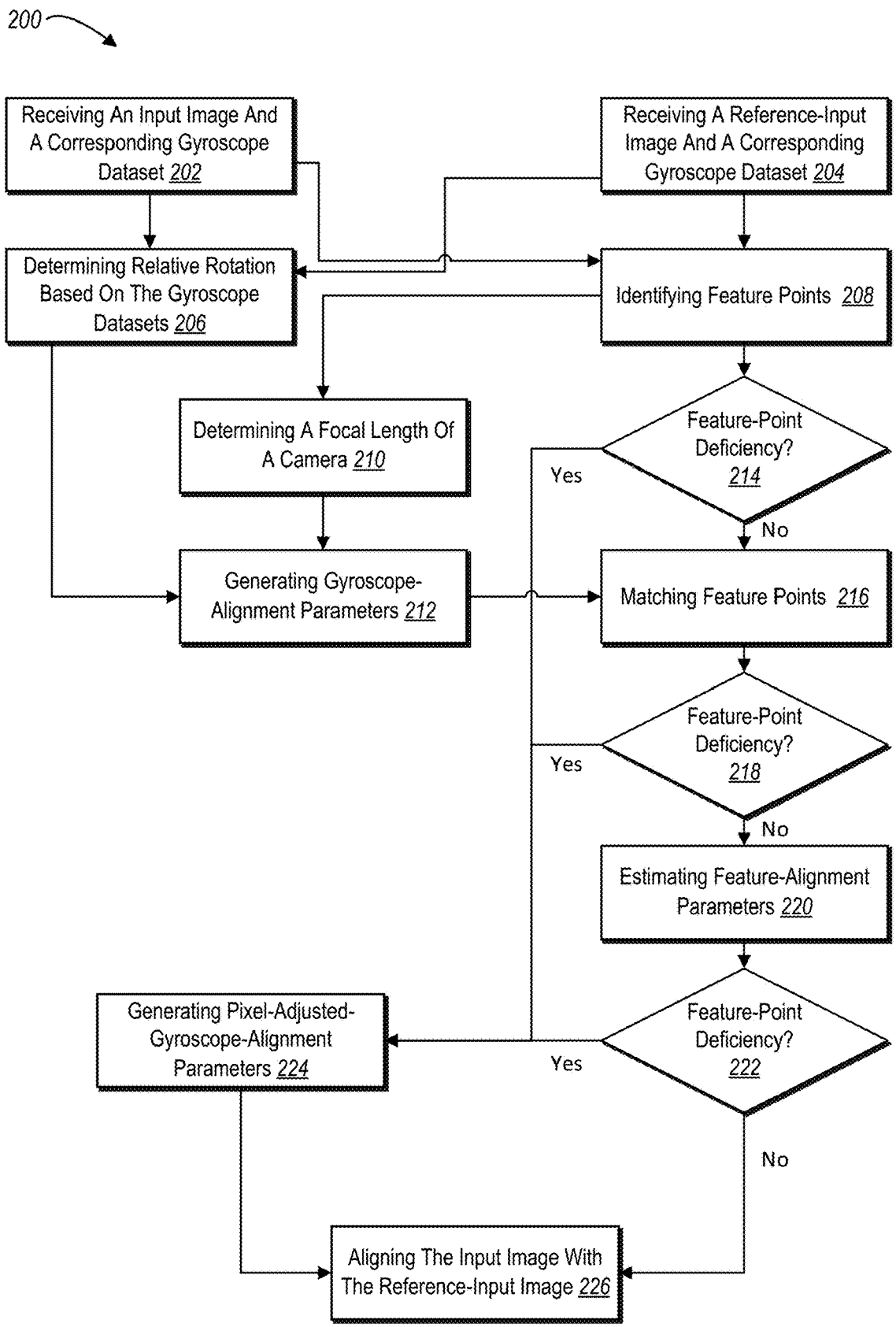
FIG. 2 illustrates a sequence-flow diagram for selecting and applying an image-alignment model from a pixel-adjusted-gyroscope-alignment model and a feature-based-alignment model to align an input image with a reference-input image in accordance with one or more embodiments.

FIG. 2 illustrates the dynamic-image-alignment system 100 selecting between image-alignment models. In particular, FIG. 2 depicts a sequence-flow diagram 200 of acts 202-226 by which the dynamic-image-alignment system 100 selects and applies an image-alignment model from a pixel-adjusted-gyroscope-alignment model and a feature-based-alignment model to align an input image with a reference-input image in accordance with one or more embodiments. As indicated by the sequence-flow diagram 200, upon detecting a feature-point deficiency corresponding to a feature-based-alignment model, the dynamic-image-alignment system 100 applies a pixel-adjusted-gyroscope-alignment model to align an input image with a reference-input image. Upon determining an absence of a feature-point deficiency, by contrast, the dynamic-image-alignment system 100 applies a pixel-based-alignment model to align an input image with a reference-input image.

As shown in FIG. 2, the dynamic-image-alignment system 100 performs the act 202 of receiving an input image and a corresponding gyroscope dataset and the act 204 of receiving a reference-input image and a corresponding gyroscope dataset. When receiving such an input image and reference-input image, in certain embodiments, the dynamic-image-alignment system 100 receives an input image and a reference-image captured by a camera of a computing device (e.g., mobile device). In some cases, the computing device records or registers a gyroscope dataset (e.g., an indication of orientation or attitude of a camera based on angular momentum around each axis) at the time a camera captures the input image and an additional gyroscope dataset at the time the camera capture the reference-input image.

As used in this disclosure, the term "gyroscope dataset" refers to gyroscope readings corresponding to a device utilized to capture a digital image. In some embodiments, a gyroscope dataset refers to a gyroscope reading (e.g., angular momentum around each axis) captured by a gyroscope sensor or inertial measurement unit ("IMU") at the time a camera captures a digital image. The dynamic-image-alignment system 100 may refer to, store, or use a gyroscope dataset in a particular format. For instance, the dynamic-image-alignment system 100 may use a gyroscope dataset stored as Euler angles (e.g., proper Euler angles or Tait-Bryan angles) and rotation data (e.g., rotational velocities) or stored as quaternions. In either case, the dynamic-image-alignment system 100 may present such gyroscope datasets in a gyroscope data matrix, such as a rotation matrix for gyroscope readings.

As further shown in FIG. 2, the dynamic-image-alignment system 100 performs an act 206 of determining relative rotation based on the gyroscope datasets. For instance, in some cases, the dynamic-image-alignment system 100 determines a relative rotation between the input image and the reference-input image based on (i) the gyroscope dataset corresponding to the input image and (ii) the gyroscope dataset corresponding to the reference-input image. In some such embodiments, the dynamic-image-alignment system 100 can determine a relative rotation from the reference-input image to the input image by comparing (and determining a difference between) the gyroscope dataset corresponding to the input image and the gyroscope dataset corresponding to the reference-input image.

In addition to determining relative rotation, the dynamic-image-alignment system 100 further performs the act 208 of identifying feature points within the input image and the reference-input image. In some embodiments, for instance, the dynamic-image-alignment system 100 utilizes a SIFT or SURF algorithm to detect a set of feature points within the input image and a set of feature points within the reference-input image. Upon detection, the dynamic-image-alignment system 100 can extract the respective sets of feature points within the input image and the reference-input image.

As indicated by the remaining acts 210-226, the dynamic-image-alignment system 100 uses the identified feature points and corresponding gyroscope datasets to either generate and apply pixel-adjusted-gyroscope-alignment parameters or to generate and apply feature-alignment parameters. As shown in FIG. 2, the dynamic-image-alignment system 100 performs the acts 214, 218, and 222 to determine (at various decision points) whether feature points or feature-alignment parameters corresponding to the input image and reference-input image demonstrate a feature-point deficiency. If the feature points or feature-alignment parameters indicate a feature-point deficiency, the dynamic-image-alignment system 100 generates and applies pixel-adjusted-gyroscope-alignment parameters (as part of a pixel-adjusted-gyroscope-alignment model). If the feature points or feature-alignment parameters indicate an absence of a feature-point deficiency, the dynamic-image-alignment system 100 continues acts that lead toward generating and applying feature-alignment parameters (as part of a feature-based-alignment model).

As shown in FIG. 2, for instance, the dynamic-image-alignment system 100 performs the act 210 of determining a focal length of a camera. For instance, in some embodiments, the dynamic-image-alignment system 100 estimates a focal length of a camera that captures the input image and/or the reference-input image. When determining the focal length of a camera that captures a set of input images, the dynamic-image-alignment system 100 can update an estimate of the focal length based on additional input images captured by the camera. Alternatively, in certain implementations, the dynamic-image-alignment system 100 queries a computing device that captures the input image for a focal length.

In addition to determining a focal length, the dynamic-image-alignment system 100 further performs the act 212 of generating gyroscope-alignment parameters. As indicated by FIG. 2, in some embodiments, the dynamic-image-alignment system 100 generates gyroscope-alignment parameters based on gyroscope datasets respectively corresponding to the input image and the reference-input image and a focal length of a camera. In some such embodiments, the dynamic-image-alignment system 100 generates gyroscope-alignment parameters based on the relative rotation between the input image and the reference-input image determined by act 206.

As further shown in FIG. 2, the dynamic-image-alignment system 100 performs the act 214 of determining whether feature points within one or both of the input image and the reference-input image include a feature-point deficiency. For instance, in certain embodiments, the dynamic-image-alignment system 100 determines whether a set of feature points within the input image and/or a set of feature points within the reference-input image satisfy a threshold amount of feature points. As indicated in FIG. 2, if the feature points within one or both of the input image and the reference-input image do not satisfy the threshold amount of feature points—and indicate a feature-point deficiency at the decision point—the dynamic-image-alignment system 100 forgoes applying a feature-based-alignment model and generates pixel-adjusted-gyroscope-alignment parameters in the act 224. If, however, the feature points within both of the input image and the reference-input image satisfy the threshold amount of feature points—and indicate an absence of a feature-point deficiency at the decision point—the dynamic-image-alignment system 100 continues with acts for the feature-based-alignment model.

As indicated by FIG. 2, upon determining an absence of a feature-point deficiency in act 214, the dynamic-image-alignment system 100 performs the act 216 of matching feature points between the input image and the reference-input image. For example, in certain implementations, the dynamic-image-alignment system 100 matches feature points from a feature-point set within the input image to features points from a feature-point set within the reference-input image. In some such embodiments, the dynamic-image-alignment system 100 matches feature points between the input image and the reference-input image according to a Brute-Force Matcher algorithm, a Fast Library for Approximate Nearest Neighbors ("FLANN") algorithm, or any other suitable feature-point-matching algorithm.

After matching feature points, in some cases, the dynamic-image-alignment system 100 further removes (or filters out) a subset of the matching feature points that conflict with the gyroscope-alignment parameters from act 206. By removing such conflicting matched feature points, the dynamic-image-alignment system 100 creates a filtered set of matching feature points between the input image and the reference-input image.

As further shown in FIG. 2, the sequence-flow diagram 200 includes another decision point, that is the act 218. In some embodiments, the dynamic-image-alignment system 100 performs the act 218 of determining whether matching feature points between the input image and the reference-input image include a feature-point deficiency. For instance, in certain implementations, the dynamic-image-alignment system 100 determines whether matching feature points between the input image and the reference-input image satisfy a threshold amount of matching feature points. As indicated in FIG. 2, if the matching feature points do not satisfy the threshold amount of feature points—and indicate a feature-point deficiency at the decision point—the dynamic-image-alignment system 100 forgoes applying a feature-based-alignment model and generates pixel-adjusted-gyroscope-alignment parameters in the act 224. If, however, the matching feature points satisfy the threshold amount of matching feature points—and indicate an absence of a feature-point deficiency at the decision point—the dynamic-image-alignment system 100 continues with acts for the feature-based-alignment model.

Upon determining an absence of a feature-point deficiency in act 218, the dynamic-image-alignment system 100 performs the act 220 of estimating feature-alignment parameters. For example, in some embodiments, the dynamic-image-alignment system 100 uses the matching feature points between the input image and the reference-input image to estimate feature-alignment parameters. As indicated above, the dynamic-image-alignment system 100 can apply a RANSAC algorithm, LMedS regression algorithm, or other suitable robust-model algorithm to generate the feature-alignment parameters.

As further shown in FIG. 2, the sequence-flow diagram 200 includes a final decision point, that is the act 222. In some embodiments, the dynamic-image-alignment system 100 performs the act 222 of determining whether feature-alignment parameters include a feature-point deficiency. For instance, in certain implementations, the dynamic-image-alignment system 100 determines whether the feature-alignment parameters would reasonably align the input image with the reference-input image based on (or with reference to) gyroscope datasets captured by a computing device or gyroscope-alignment parameters. For instance, the dynamic-image-alignment system 100 can determine a differential between feature-alignment parameters corresponding to a feature-based-alignment model and a range of expected feature-alignment parameters for an input image determined from a relative rotation (e.g., a range comprising maximum and minimum expected feature-alignment parameters for an input image based on gyroscope datasets or gyroscope-alignment parameters).

Consistent with the decision points above, if the feature-alignment parameters would not reasonably align the input image with the reference-input image—and indicate a feature-point deficiency—the dynamic-image-alignment system 100 forgoes applying a feature-based-alignment model and generates pixel-adjusted-gyroscope-alignment parameters in the act 224. If, however, the feature-alignment parameters would reasonably align the input image with the reference-input image—and indicate an absence of a feature-point deficiency at the decision point—the dynamic-image-alignment system 100 continues to the act 226 of aligning the input image with the reference-input image (based on the feature-alignment parameters estimated in the act 220).

As just indicated, if the dynamic-image-alignment system 100 detects a feature-point deficiency while performing any of the acts 214, 218, or 222, the dynamic-image-alignment system 100 selects a pixel-adjusted-gyroscope-alignment model instead of a feature-based-alignment model for aligning the input image with the reference-input image. In particular, upon detecting a feature-point deficiency in the acts 214, 218, or 222, the dynamic-image-alignment system 100 forgoes applying a feature-based-alignment model and performs the act 224 of generating pixel-adjusted-gyroscope-alignment parameters.

As a precursor to generating pixel-adjusted-gyroscope-alignment parameters, in some embodiments, the dynamic-image-alignment system 100 warps the input image according to the gyroscope-alignment parameters generated in the act 212 and estimates pixel-based-alignment parameters that would align the warped image with the reference-input image. Based on both the pixel-based-alignment parameters and the gyroscope-alignment parameters, in some embodiments, the dynamic-image-alignment system 100 generates the pixel-adjusted-gyroscope-alignment parameters.

As further shown in FIG. 2, the dynamic-image-alignment system 100 performs the act 226 of aligning the input image with the reference-input image. As suggested above, if the feature points or feature-alignment parameters indicate a feature-point deficiency, the dynamic-image-alignment system 100 generates and applies the pixel-adjusted-gyroscope-alignment parameters to the input image to align the input with the reference-input image. If the feature points and the feature-alignment parameters indicate an absence of a feature-point deficiency, the dynamic-image-alignment system 100 generates and applies feature-alignment parameters to the input image to align the input with the reference-input image.

As described above, FIG. 2 demonstrates a flexible and selective image-alignment algorithm. In contrast to some conventional image-alignment systems, the disclosed dynamic-image-alignment system 100 in FIG. 2 uses a flexible approach that selects between a pixel-adjusted-gyroscope-alignment model and a feature-based-alignment model to align digital images. Alternatively, in some embodiments, the dynamic-image-alignment system 100 employs a different selective image-alignment algorithm—by using a feature-point-deficiency metric to select between a pixel-based-alignment model and a feature-based-alignment model to align digital images. Accordingly, based on identifying a feature-point deficiency, in some cases, the dynamic-image-alignment system 100 optionally applies a pixel-based-alignment model (instead of a feature-based-alignment model) to align an input image with a reference-input image. In such embodiments, the dynamic-image-alignment system 100 applies the pixel-based-alignment model by comparing pixels across an input image and a reference-input image and determining pixel-based-alignment parameters for aligning the input image with the reference-input image based on overlapping pixels between the images.

Figure 3:
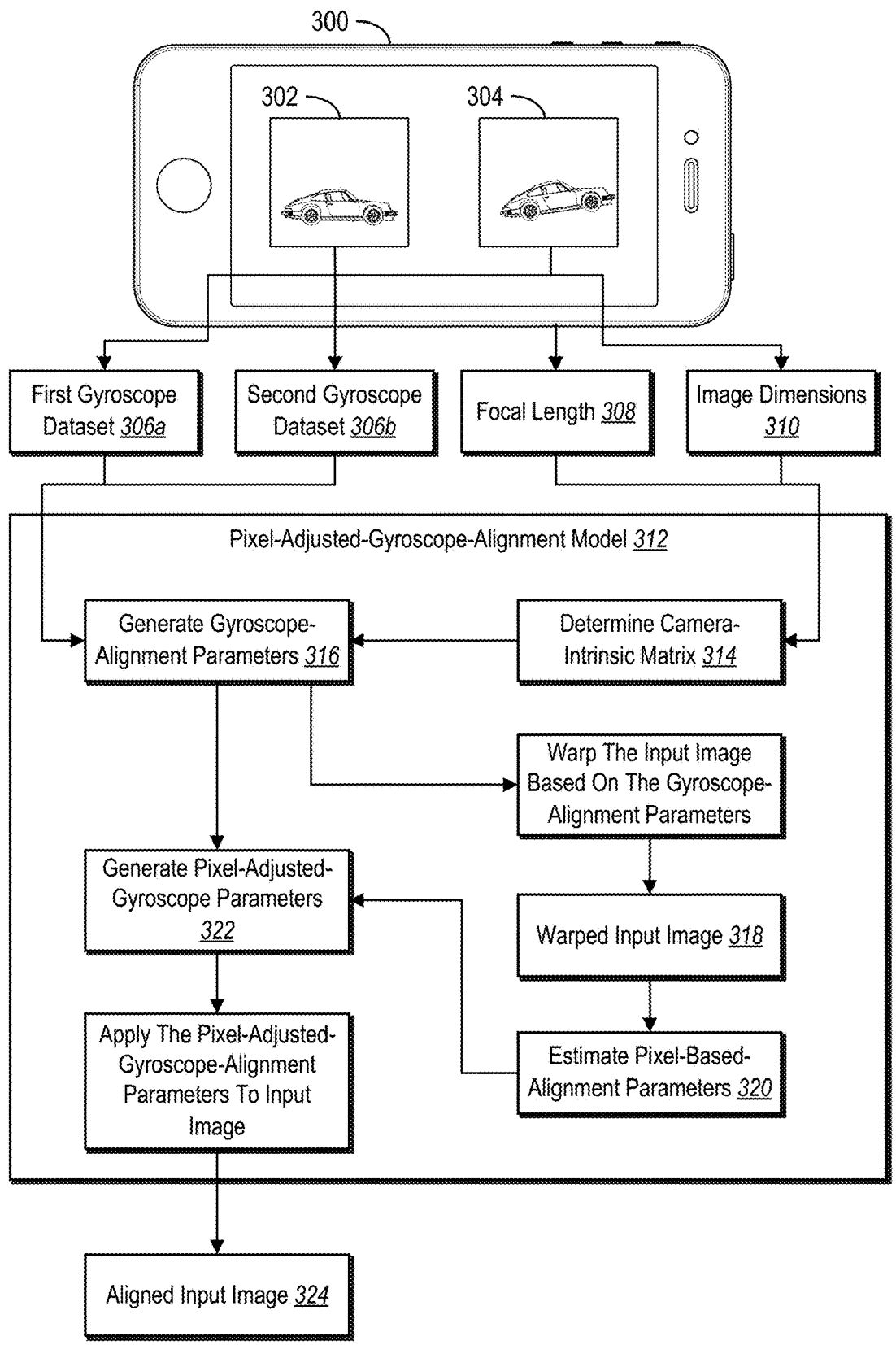
FIG. 3 illustrates the dynamic-image-alignment system applying a pixel-adjusted-gyroscope-alignment model in accordance with one or more embodiments.

As just noted, in some embodiments, the dynamic-image-alignment system 100 can apply a pixel-adjusted-gyroscope-alignment model to align digital images. FIG. 3 depicts an embodiment of a pixel-adjusted-gyroscope-alignment model 312. As an overview of FIG. 3, the dynamic-image-alignment system 100 identifies a first gyroscope dataset 306a corresponding to a reference-input image 302 and a second gyroscope dataset 306b corresponding to an input image 304. Based on the first gyroscope dataset 306a and the second gyroscope dataset 306b, the dynamic-image-alignment system 100 generates gyroscope-alignment parameters 316 for aligning the input image 304 with the reference-input image 302. The dynamic-image-alignment system 100 further generates pixel-adjusted-gyroscope-alignment parameters 322 based on the gyroscope-alignment parameters 316 and pixel-based-alignment parameters 320. Having generated the pixel-adjusted-gyroscope-alignment parameters 322, the dynamic-image-alignment system 100 applies the pixel-adjusted-gyroscope-alignment parameters 322 to the input image 304 to align the input image 304 with the reference-input image 302.

As shown in FIG. 3, a camera of a computing device 300 captures the reference-input image 302 and the input image 304. The computing device 300 subsequently provides (and the dynamic-image-alignment system 100 receives) the reference-input image 302 and the input 10 image 304 for analysis. For instance, in some embodiments, the computing device 300 detects a user selection of a selectable option to align digital images (e.g., a selection of an option to align the input image 304 with the reference-input image 302). Based on detecting the user selection, in some embodiments, the dynamic-image-alignment system 100 analyzes the reference-input image 302 and the input image 304 for the pixel-adjusted-gyroscope-alignment model 312.

After image capture, the dynamic-image-alignment system 100 identifies the first gyroscope dataset 306a corresponding to the reference-input image 302 and the second gyroscope dataset 306b corresponding to the input image 304. In some embodiments, the computing device 300 uses a gyroscope sensor or an IMU to record (i) gyroscope readings at a time the camera captures the reference-input image 302 and (ii) gyroscope readings at a time the camera captures the input image 304. Because the first gyroscope dataset 306a and the second gyroscope dataset 306b may differ from each other, the dynamic-image-alignment system 100 can use this differential to determine a relative rotation between the input image 304 and the reference-input image 302.

Additionally, in certain embodiments, the computing device 300 stores the gyroscope readings as the first gyroscope dataset 306a and the second gyroscope dataset 306b for the dynamic-image-alignment system 100. Consistent with the disclosure above, in some cases, the computing device 300 stores the first gyroscope dataset 306a and the second gyroscope dataset 306b as Euler angles and rotation data or (to avoid gimbal lock sometimes present with Euler angles) as quaternions.

As further shown in FIG. 3, the dynamic-image-alignment system 100 determines the focal length 308 for the camera in the computing device 300. In certain implementations, the dynamic-image-alignment system 100 queries the computing device 300 for the focal length 308. For instance, the dynamic-image-alignment system 100 can query the computing device 300 for the focal length 308 based on the camera lens's intrinsic calibration when the camera captures the reference-input image 302 and/or the input image 304.

Alternatively, in certain embodiments, the dynamic-image-alignment system 100 estimates the focal length 308 based on matching feature points between the reference-input image 302 and the input image 304. For instance, the dynamic-image-alignment system 100 can estimate the focal length 308 when (i) matching feature points between the reference-input image 302 and the input image 304 satisfy a threshold amount of matching feature points and (ii) the camera pans between capturing the reference-input image 302 and the input image 304. In some embodiments, the dynamic-image-alignment system 100 estimates the focal length 308 using a calibration method and expresses the focal length 308 in pixels. In some such cases, the dynamic-image-alignment system 100 estimates the focal length 308 using methods for determining focal length described by Richard Szeliski, "Image Alignment and Stitching: A Tutorial," *Foundations and Trends in Computer Graphics and Vision*, Vol. 2, No. 1 (2006) (hereinafter "Szeliski"), the entire contents of where are hereby incorporated by reference. Because pixels are sometimes not quadratic, in certain implementations, the dynamic-image-alignment system 100 determines a first focal length for a horizontal dimension (fx) and a second focal length for a vertical dimension (fy) when determining the focal length 308.

As shown in FIG. 3, in addition to determining the focal length 308, the dynamic-image-alignment system 100 identifies image dimensions 310. For example, in some embodiments, the dynamic-image-alignment system 100 identifies the height and width of the reference-input image 302 and/or the height and width of input image 304. Additionally, or alternatively, in certain implementations, the dynamic-image-alignment system 100 identifies a principal point-offset for the camera and/or an axis skew when identifying the image dimensions 310.

Having determined the focal length 308 and the image dimensions 310, the dynamic-image-alignment system 100 applies the pixel-adjusted-gyroscope-alignment model 312 by using the first gyroscope dataset 306a, the second gyroscope dataset 306b, the focal length 308, and the image dimensions 310. As shown in FIG. 3, for example, based on the focal length 308 and the image dimensions 310, the dynamic-image-alignment system 100 determines a camera-intrinsic matrix 314. In some cases, the dynamic-image-alignment system 100 determines the camera-intrinsic matrix 314 by creating a matrix of intrinsic camera parameters that includes the focal length 308 and a principal axis. Further, in some such embodiments, the dynamic-image-alignment system 100 determines the camera-intrinsic matrix 314 comprising a focal length, principal point-offset, and an axis skew. In certain cases, the dynamic-image-alignment system 100 determines the camera-intrinsic matrix 314 by determining an intrinsic calibration matrix described by Szeliski or by determining a calibration matrix described by Richard Hartley and Andrew Zisserman, *Multiple View Geometry in Computer Vision*, Ch. 8 (2d ed. 2004), the entire contents of which are hereby incorporated by reference.

As further shown in FIG. 3, after determining the camera-intrinsic matrix 314, the dynamic-image-alignment system 100 generates the gyroscope-alignment parameters 316 based on the first and second gyroscope datasets 306a and 306b and the camera-intrinsic matrix 314. For example, in certain embodiments, the dynamic-image-alignment system 100 generates the gyroscope-alignment parameters 316 based on a relative rotation between the reference-input image 302 and the input image 304—as indicated by the first gyroscope dataset 306a and the second gyroscope dataset 306b. In particular, in some such embodiments, the dynamic-image-alignment system 100 generates the gyroscope-alignment parameters 316 based on the camera-intrinsic matrix 314, the first gyroscope dataset 306a (expressed as a rotation matrix), and the second gyroscope dataset 306b (also expressed as a rotation matrix).

As indicated in FIG. 3, in some embodiments, the dynamic-image-alignment system 100 generates the gyroscope-alignment parameters 316 such that the gyroscope-alignment parameters 316, when applied to the input image 304, would approximately align the input image 304 with the reference-input image 302. Here, the gyroscope-alignment parameters 316 approximately align the input image 304 with the reference-input image 302 because, in the pixel-adjusted-gyroscope-alignment model 312, the dynamic-image-alignment system 100 further adjusts the gyroscope-alignment parameters 316 to generate more precise alignment parameters (e.g., by adjusting or combining the gyroscope-alignment parameters 316 with pixel-based-alignment parameters).

After generating the gyroscope-alignment parameters 316, in some embodiments, the dynamic-image-alignment system 100 warps the input image 304 based on the gyroscope-alignment parameters 316 to generate a warped input image 318. For instance, in certain implementations, the dynamic-image-alignment system 100 applies the gyroscope-alignment parameters 316 to the input image 304 to perform a homography transformation and to generate the warped input image 318. Accordingly, the warped input image 318 is a warped version of the input image 304.

As further shown in FIG. 3, after generating the warped input image 318, the dynamic-image-alignment system 100 estimates pixel-based-alignment parameters 320. In particular, in some embodiments, the dynamic-image-alignment system 100 estimates translation parameters that would align the warped input image 318 with the reference-input image 302 based on comparing (e.g., reducing alignment error for) pixels between both images. For example, in certain implementations, the dynamic-image-alignment system 100 down-samples the reference-input image 302 and the warped input image 318. In some such implementations, the dynamic-image-alignment system 100 subsequently applies error metrics (e.g., sum of squared differences or sum of absolute differences, root mean squared intensity pixel error, normalized cross-correlation), hierarchical motion estimation, or Fourier-based alignment to the down-sampled reference-input image 302 and the down-sampled warped input image 318. Based on such error metrics, hierarchical motion estimation, or Fourier-based alignment, the dynamic-image-alignment system 100 estimates alignment parameters that would translate pixels from the down-sampled warped input image 318 to the reference-input image 302.

By employing error metrics, hierarchical motion estimation, or Fourier-based alignment to perform a simple pixel-based translation for down-sampled images (i.e., a pixel-based translation applied to a warped image already roughly aligned based on gyroscope data), the dynamic-image-alignment system 100 can avoid the processing load consumed by conventional pixel-based-alignment approaches. Even in comparison to hierarchal sampling of pixels employed by some conventional pixel-based-alignment approaches, the dynamic-image-alignment system 100 expedites estimating the pixel-based-alignment parameters 320 by utilize both gyroscope data and a down-sampled pixel-based translation. In the alternative, in some embodiments, the dynamic-image-alignment system 100 estimates pixel-based-alignment parameters 320 using hierarchical coarse-to-fine or Fourier transform techniques described by Szeliski.

Indeed, in one or more embodiments, gyroscope data reflects rotational data and panning of a camera utilized to capture the digital image (but not necessarily translation data). By utilizing a fast pixel-based translation estimation on down-sampled input images, the dynamic-image-alignment system 100 can determine translation information with little computational expenditure. The dynamic-image-alignment system 100 can then combine the translation transformation (e.g., pixel-based-alignment parameters) with the rotation transformation (e.g., gyroscope-alignment parameters) to form final alignment parameters (e.g., pixel-adjusted-gyroscope-alignment parameters).

Figure 4:
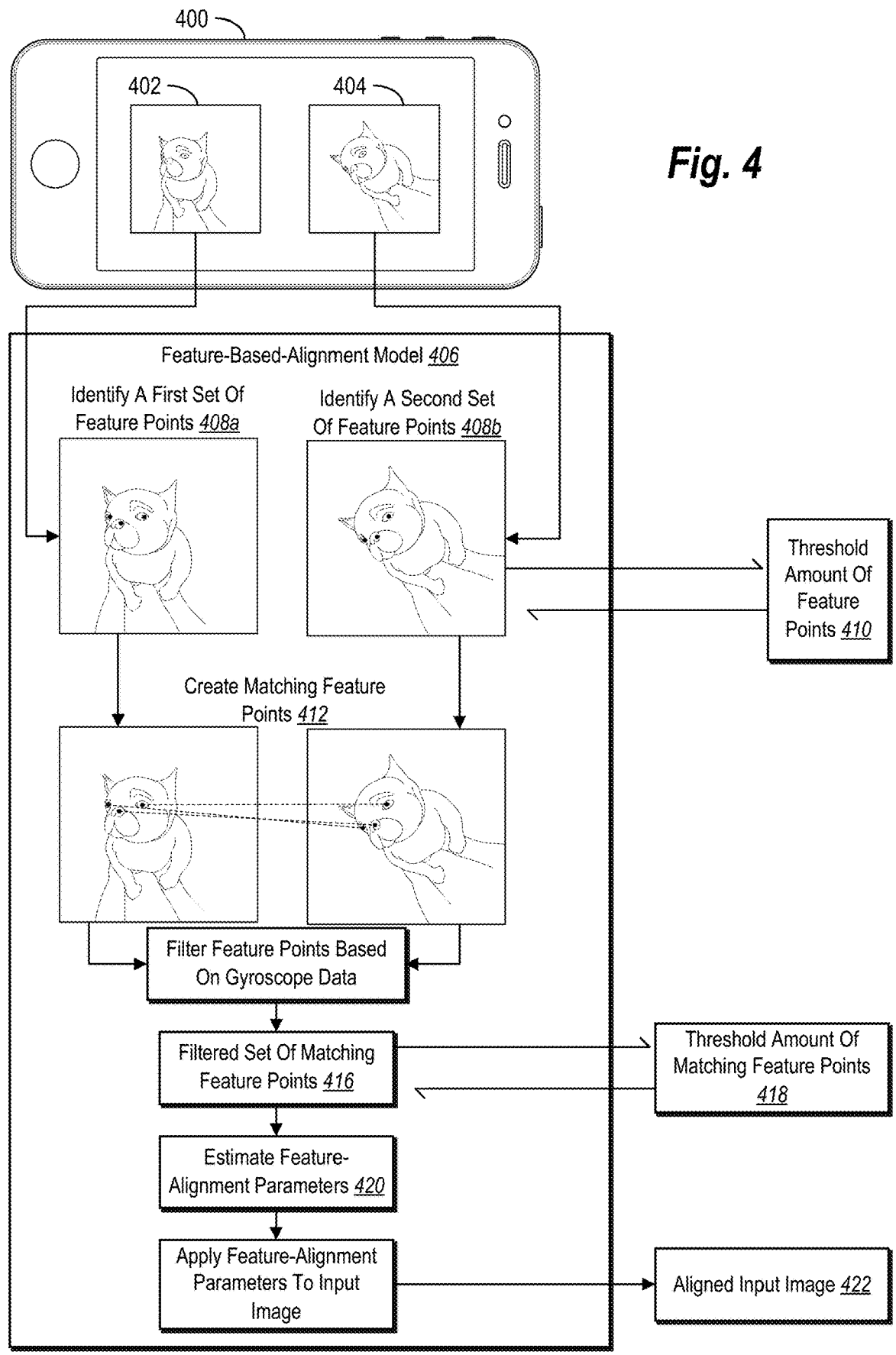
FIG. 4 illustrates the dynamic-image-alignment system applying a feature-based-alignment model to align an input image with a reference-input image in accordance with one or more embodiments.

As indicated in FIG. 4, in some embodiments, the dynamic-image-alignment system 100 estimates the pixel-based-alignment parameters 320 such that the pixel-based-alignment parameters 320, when applied to the input image 304, would approximately align the input image 304 with the reference-input image 302. Indeed, in relation to FIG. 4, the dynamic-image-alignment system 100 uses the pixel-based-alignment parameters 320 to refine or to generate more precise alignment parameters (e.g., by adjusting or combining the gyroscope-alignment parameters 316 with pixel-based-alignment parameters). Moreover, as described above, the dynamic-image-alignment system 100 can estimate the pixel-based-alignment parameters 320 using less computational processing and avoids the searching of each constituent pixel of an image (as required by some conventional pixel-based approaches).

As further shown in FIG. 3, after estimating the pixel-based-alignment parameters 320, the dynamic-image-alignment system 100 generates the pixel-adjusted-gyroscope-alignment parameters 322. In particular, the dynamic-image-alignment system 100 generates the pixel-adjusted-gyroscope-alignment parameters 322 based on the gyroscope-alignment parameters 316 and the estimated pixel-based-alignment parameters 320. For instance, in some embodiments, the dynamic-image-alignment system 100 adjusts the gyroscope-alignment parameters 316 based on the estimated pixel-based-alignment parameter 320 to generate the pixel-adjusted-gyroscope-alignment parameters 322. In certain implementations, the dynamic-image-alignment system 100 combines or multiplies the gyroscope-alignment parameters 316 and the estimated pixel-based-alignment parameters 320 to generate the pixel-adjusted-gyroscope-alignment parameters 322.

As indicated by FIG. 3, upon generating the pixel-adjusted-gyroscope-alignment parameters 322, the dynamic-image-alignment system 100 applies the pixel-adjusted-gyroscope-alignment parameters 322 to the input image 304 to generate an aligned input image 324. By applying the pixel-adjusted-gyroscope-alignment parameters 322 to the input image 304, the dynamic-image-alignment system 100 shifts or warps the input image 304 to align with the reference-input image 302. For instance, in some embodiments, the dynamic-image-alignment system 100 warps the input image 304 according to a homography transformation encoded by the pixel-adjusted-gyroscope-alignment parameters 322 to generate the aligned input image 324.

As depicted in FIG. 3, the dynamic-image-alignment system 100 can apply the pixel-adjusted-gyroscope-alignment model 312 independent of detecting a feature-point deficiency and independent of a feature-based-alignment model. By contrast, in certain implementations, the pixel-adjusted-gyroscope-alignment model 312 can be part of a selective image-alignment algorithm that selects between the pixel-adjusted-gyroscope-alignment model 312 and a feature-based-alignment model. FIG. 4 illustrates an example of one such feature-based-alignment model.

FIG. 4 depicts the dynamic-image-alignment system 100 applying a feature-based-alignment model 406 to align an input image 404 with a reference-input image 402 in accordance with one or more embodiments. As an overview, the dynamic-image-alignment system 100 identifies a first set of feature points 408a within the reference-input image 402 and a second set of feature points 408b within the input image 404. The dynamic-image-alignment system 100 further matches feature points between the reference-input image 402 and the input image 404 to create matching feature points 412. Based on a filtered set of matching feature points 416, the dynamic-image-alignment system 100 estimates feature-alignment parameters 420 corresponding to the feature-based-alignment model 406 and applies the feature-alignment parameters 420 to the input image

404. To guide implementation of the feature-based-alignment model 406, in some embodiments, the dynamic-image-alignment system 100 determines various feature-point-deficiency metrics indicated in FIG. 4 and compares the metrics to deficiency thresholds.

As shown in FIG. 4, a camera of a computing device 400 captures the reference-input image 402 and the input image 404. The computing device 400 subsequently provides (and the dynamic-image-alignment system 100 receives) the reference-input image 402 and the input image 404 for analysis. For instance, in some embodiments, the computing device 400 detects a user selection of a selectable option to align digital images. Based on detecting the user selection, the dynamic-image-alignment system 100 analyzes the reference-input image 402 and the input image 404 for the feature-based-alignment model 406.

After image capture, the dynamic-image-alignment system 100 identifies the first set of feature points 408a within the reference-input image 402 and the second set of feature points 408b within the input image 404. In some embodiments, the dynamic-image-alignment system 100 uses a BRIEF, FAST, ORB, or other suitable detection algorithm as part of identifying the first set of feature points 408a within the reference-input image 402 and the second set of feature points 408b within the input image 404. Upon detection, in certain implementations, the dynamic-image-alignment system 100 further extracts the first set of feature points 408a and the second set of feature points 408b and formats each as a feature descriptor or feature vector.

As further shown in FIG. 4, in addition to identifying the first set of feature points 408a and the second set of feature points 408b, the dynamic-image-alignment system 100 determines a feature-point-deficiency metric for each of the first set of feature points 408a and the second set of feature points 408b and then compares the feature-point-deficiency metric to a deficiency threshold. As indicated by FIG. 4, for instance, the dynamic-image-alignment system 100 determines (i) a first feature-point-deficiency metric by determining a number of feature points in the first set of feature points 408a and (ii) a second feature-point-deficiency metric by determining a number of feature points within the second set of feature points 408b. The dynamic-image-alignment system 100 further compares each of the numbers of feature points to a threshold amount of feature points 410.

In certain implementations, the threshold amount of feature points 410 can be a predetermined or relative amount of feature points. For instance, in some embodiments, the dynamic-image-alignment system 100 determines whether each of the first set of feature points 408a and the second set of feature points 408b include a predetermined threshold number of feature points. By contrast, in some embodiments, the dynamic-image-alignment system 100 determines whether the first set of feature points 408a includes a threshold number of feature points relative to the number of feature points within the second set of feature points 408b. In FIG. 4, for instance, the dynamic-image-alignment system 100 determines that each of the first set of feature points 408a and the second set of feature points 408b satisfy the threshold amount of feature points 410.

As further shown in FIG. 4, the dynamic-image-alignment system 100 creates matching feature points 412 by matching feature points from among the first set of feature points 408a within the reference-input image 402 and the second set of feature points 408b within the input image 404. For instance, in some embodiments, the dynamic-image-alignment system 100 matches feature points between the reference-input image 402 and the input image 404 according to a Brute-Force Matcher algorithm, a FLANN algorithm, or other suitable feature-point-matching algorithm.

After matching feature points, in certain embodiments, the dynamic-image-alignment system 100 filters feature points based on gyroscope data to create a filtered set of matching feature points 416. For example, in some cases, the dynamic-image-alignment system 100 generates gyroscope-alignment parameters that align the reference-input image 402 with the input image 404 using the methods described above.

The dynamic-image-alignment system 100 further compares the matching feature points 412 to the gyroscope-alignment parameters and determines whether any of the matching feature points 412 are inconsistent with the gyroscope-alignment parameters. For example, the dynamic-image-alignment system 100 can apply the gyroscope-alignment parameters and determine that two "matching" feature points are on opposite sides of a scene portrayed in the digital images. Specifically, dynamic-image-alignment system 100 can compare the gyroscope-alignment parameters with an alignment indicated by matching feature points. If the two alignments differ by a threshold amount, the dynamic-image-alignment system 100 can determine that the matching feature points are erroneous. Thus, the dynamic-image-alignment system 100 can utilize the gyroscope-alignment parameters to determine that matching feature points are not actually matching.

Upon determining inconsistencies between the matching feature points 412 and the gyroscope-alignment parameters, the dynamic-image-alignment system 100 then removes any conflicting matching feature points from the matching feature points 412. Upon removing or filtering out the conflicting matching feature points, the dynamic-image-alignment system 100 identifies the remaining matching feature points as the filtered set of matching feature points 416.

In addition to creating the filtered set of matching feature points 416, in some embodiments, the dynamic-image-alignment system 100 determines a feature-point-deficiency metric based on the filtered set of matching feature points 416. As indicated by FIG. 4, the dynamic-image-alignment system 100 determines a feature-point-deficiency metric by determining a number of matching feature points within the filtered set of matching feature points 416. In some embodiments, the dynamic-image-alignment system 100 can also determine a feature-point-deficiency metric by determining a number of matching feature points within the matching feature points 412.

As indicated by FIG. 4, the dynamic-image-alignment system 100 further compares the number of matching feature points within the filtered set of matching feature points 416 (or, alternatively, the number of matching feature points within the matching feature points 412) to a threshold amount of matching feature points 418. For example, in some embodiments, the dynamic-image-alignment system 100 determines whether the filtered set of matching feature points 416 include a predetermined threshold number of matching feature points. Additionally, or alternatively, in some embodiments, the dynamic-image-alignment system 100 determines whether the filtered set of matching feature points 416 include a threshold number of matching feature points given the pixel count or size of the reference-input image 402 and the input image 404. In FIG. 4, the dynamic-image-alignment system 100 determines that the filtered set of matching feature points 416 (or, alternatively, the matching feature points 412) satisfy the threshold amount of matching feature points 418.

As further shown in FIG. 4, the dynamic-image-alignment system 100 estimates the feature-alignment parameters 420. As the feature-based-alignment model 406 suggests, the dynamic-image-alignment system 100 estimates the feature-alignment parameters 420 based on the filtered set of matching feature points 416 or, alternatively, based on the matching feature points 412. As suggested above, the dynamic-image-alignment system 100 can apply a RANSAC algorithm, LMedS regression algorithm, or other suitable feature-based-image-alignment algorithm to the filtered set of matching feature points 416 (or the matching feature points 412) to generate the feature-alignment parameters 420.

As suggested above, the feature-alignment parameters 420 may take the form of homography-transformation parameters or affine-transformation parameters. In some embodiments, the dynamic-image-alignment system 100 determines whether the filtered set of matching feature points 416 (or the matching feature points 412) include a threshold amount of features points to create homography-transformation parameters. If the filtered set of matching feature points 416 (or the matching feature points 412) include the threshold amount, the dynamic-image-alignment system 100 estimates homography-transformation parameters as the feature-alignment parameters 420. If, by contrast, the filtered set of matching feature points 416 (or the matching feature points 412) do not include the threshold amount, the dynamic-image-alignment system 100 estimates affine-transformation parameters as the feature-alignment parameters 420.

In addition to estimating the feature-alignment parameters 420, in some embodiments, the dynamic-image-alignment system 100 determines a feature-point-deficiency metric based on the feature-alignment parameters 420. As indicated by FIG. 4, in certain implementations, the dynamic-image-alignment system 100 determines a feature-point-deficiency metric by determining a differential between the feature-alignment parameters 420 and a range of expected feature-alignment parameters for the input image 404. In some such embodiments, the dynamic-image-alignment system 100 determines a differential between the feature-alignment parameters 420 and a range comprising maximum and minimum expected feature-alignment parameters for the input image 404 with respect to the reference-input image 402—based on the gyroscope datasets or the gyroscope-alignment parameters.

As just indicated, in some cases, the dynamic-image-alignment system 100 compares the feature-alignment parameters 420 (or a differential for the feature-alignment parameters 420) to gyroscope datasets or gyroscope-alignment parameters corresponding to the reference-input image 402 and the input image 404. Accordingly, the dynamic-image-alignment system 100 can determine whether the feature-alignment parameters 420 would reasonably align the input image 404 with the reference-input image 402 based on a comparison with (or reference to) gyroscope datasets or gyroscope-alignment parameters. For example, in some embodiments, the dynamic-image-alignment system 100 determines whether a differential for the feature-alignment parameters 420 is equal to, exceeds, or falls below an alignment threshold indicating a percentage or number of values within the feature-alignment parameters 420 that may differ from expected feature-alignment parameters indicated by gyroscope datasets or gyroscope-alignment parameters. As shown in FIG. 4, the dynamic-image-alignment system 100 determines that the feature-alignment parameters 420 would reasonably align the input image 404 with the reference-input image 402 based on a comparison with (or reference to) gyroscope datasets or gyroscope-alignment parameters (e.g., by determining that the feature-alignment parameters 420 or a differential for the feature-alignment parameters 420 satisfy an alignment threshold).

As further indicated by FIG. 4, upon generating the feature-alignment parameters 420, the dynamic-image-alignment system 100 applies the feature-alignment parameters 420 to the input image 404 to generate an aligned input image 422. By applying the feature-alignment parameters 420 to the input image 404, the dynamic-image-alignment system 100 shifts or warps the input image 404 to align with the reference-input image 402. For instance, in some embodiments, the dynamic-image-alignment system 100 warps the input image 404 according to a homography transformation (or an affine transformation) encoded by the feature-alignment parameters 420 to generate the aligned input image 422.

While this disclosure primarily refers to a feature-based-alignment model, the feature-based-alignment model 406 in FIG. 4 (and embodiments of a feature-based-alignment model described elsewhere in the disclosure) may likewise be referred to as a "guided feature-based-alignment model." Unlike conventional key-point-based alignment, in some embodiments, the dynamic-image-alignment system 100 determines one or more feature-point-deficiency metrics and compares such feature-point-deficiency metrics to one or more deficiency thresholds to guide implementation of the feature-based-alignment model 406. Moreover, unlike conventional key-point-based alignment, in certain implementations, the dynamic-image-alignment system 100 removes conflicting matching feature points to create a filtered set of matching feature points to further guide implementation of the feature-based-alignment model 406.

As noted above, in certain embodiments, the dynamic-image-alignment system 100 selects between a pixel-adjusted-gyroscope-alignment model and a feature-based-alignment model to align one more input images from a set with a reference-input image. In more particular notation, the dynamic-image-alignment system 100 may align a set of input images $I=\{I_i; i\in\{1, \ldots, N\}\}$ with a reference-input image $I_r$, where $r\in\{1, \ldots, N\}$. By using either the pixel-adjusted-gyroscope-alignment model or the feature-based alignment model to align the set of input images $I$ with the reference-input image $I_r$, the dynamic-image-alignment system 100 creates an aligned set of images $A=\{I_i^{(a)}; i\in\{1, \ldots, N\}\}$.

In certain embodiments, the dynamic-image-alignment system 100 may implement the high-level algorithm shown in Table 1 below to select and apply an image-alignment model from either a pixel-adjusted-gyroscope-alignment model or a feature-based-alignment model to align the set of input images $I$ with the reference-input image $I_r$. As discussed above, the dynamic-image-alignment system 100 can read and store gyroscope data corresponding to each input image at the capture time. In the following algorithm, each input image from the set of input images $I$ corresponds to a gyroscope dataset matrix $G_i$, where $G=\{G_i; i\in\{1, \ldots, N\}\}$. Moreover, the dynamic-image-alignment system 100 extracts a set of feature points $F_i$ from each input image of the set of input images $I$, where $F=\{F_i; i\in\{1, \ldots, N\}\}$.

TABLE 1

For the reference-input image $I_r$, extract a set of feature points $F_r$ and a gyroscope dataset $G_r$.
For i ∈ {1, . . . , r − 1, r + 1, . . . , N}:
    Extract a set of feature points $F_i$ and a gyroscope dataset $G_i$.
    Estimate/update a focal length f.
    Calculate gyroscope-based homography parameters $H_i^G$ via $G_i$ and f:
        $H_i^G = K (G_r^{-1} G_i) K^{-1}$
    in which K represents the camera-intrinsic matrix calculated using the focal length f and image dimensions.
    If a feature-point deficiency is detected in the feature extraction, jump to Failure detection step.
    Match the sets of feature points $F_r$ and $F_i$.
    Filter out the matching feature points that conflict with $H_i^G$.
    If a feature-point deficiency is detected in feature matching and filtering, jump to Failure detection step.
    Estimate feature-based-alignment parameters $H_i$.
    If a feature-point deficiency is detected in the feature-based-alignment parameters $H_i$, jump to Failure detection step.
    Jump to Image Alignment step.
    Failure detection:
        warp input image $I_i$ using $H_i^G$ transformation to create a warped input image $I_i^W$.
        Estimate pixel-based-alignment parameters $H_i^P$ between $I_r$ and the warped input image $I_i^W$.
        Set $H_i = H_i^P H_i^G$ to create pixel-adjusted-gyroscope-alignment parameters.
    Image Alignment: warp input image $I_i$ using $H_i$ transformation to align the input image $I_i$ with the reference-input image $I_r$.

As illustrated by the foregoing algorithm, the dynamic-image-alignment system 100 starts with feature-based alignment, extracting feature points using a fast algorithm (e.g., ORB key-point detection), and continues with matching the feature points, to form candidate matches utilizing a robust alignment-parameters estimation (e.g., RANSAC or LMedS). In the presence of foreground motion, many of the feature points may correspond to the foreground objects, and thus mislead the background alignment. Accordingly, the dynamic-image-alignment system 100 uses the information from a gyroscope to predict the camera motion direction and rectify the matching feature points. At each step along the path, if any failure is detected, the dynamic-image-alignment system 100 falls back to an alignment based on the gyroscope data (and pixel alignment) rather than the feature points. As discussed, failure detection may include, but is not limited to, not detecting enough feature points; not having enough feature-point matches after gyroscope-based rectification; or unreasonable alignment parameters based on the scenario.

For gyroscope (and pixel) based alignment, the dynamic-image-alignment system 100 roughly aligns an input image with a reference-input image by calculating the relative rotation between the input image and the reference-input image using the gyroscope datasets G. This step utilizes the camera focal length. The dynamic-image-alignment system 100 can estimate the focal length from the matching feature points—if there are enough feature points and there is some camera panning between digital images—or can programmatically query the focal length from a mobile device. Further, because rotation data may only capture camera panning (not the translations), the dynamic-image-alignment system 100 performs a fast pixel-based translation estimation on down-sampled input images. Then, the dynamic-image-alignment system 100 combines the translation transformation and the rotation transformations to form the final alignment parameters.

Figure 5B:
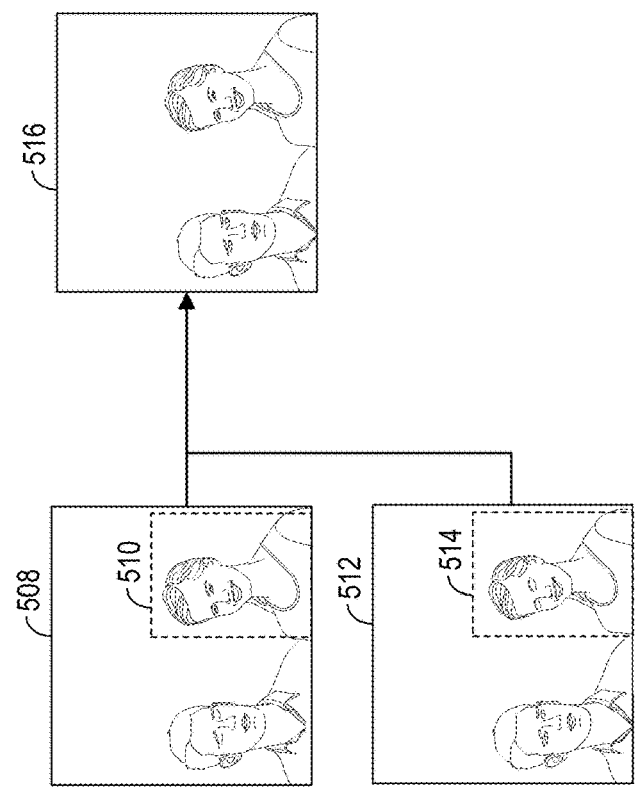
FIGS. 5A and 5B illustrate the dynamic-image-alignment system generating an enhanced digital image based on an aligned input image and a reference-input in accordance with one or more embodiments.
Figure 5A:
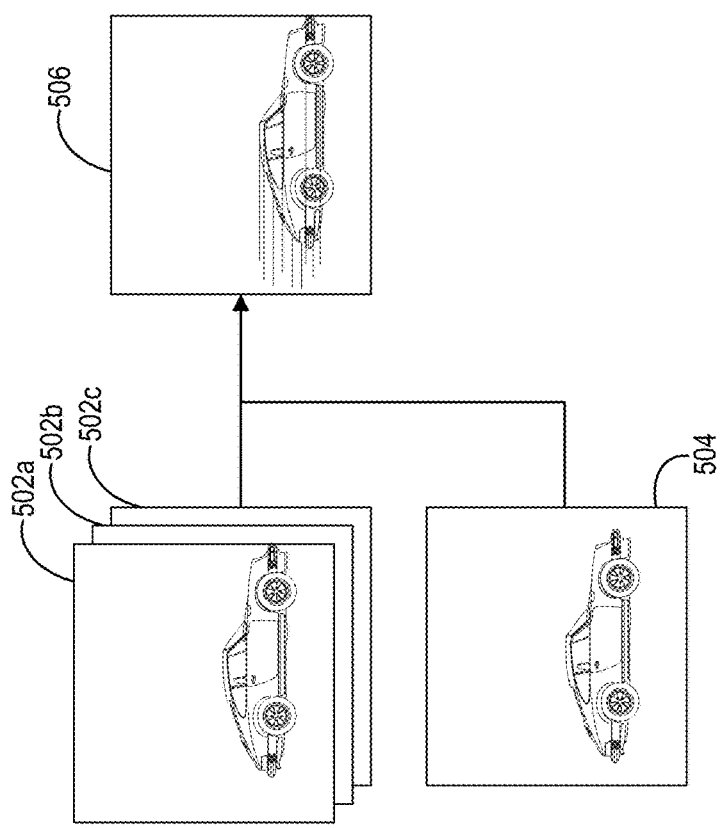

As suggested above, in some embodiments, the dynamic-image-alignment system 100 generates an enhanced digital image based on one or more input images aligned with a reference-input image. FIGS. 5A and 5B illustrate examples of the dynamic-image-alignment system 100 generating such an enhance digital image. FIG. 5A depicts the dynamic-image-alignment system 100 generating an enhanced digital image comprising a pixel blur that simulates an extended exposure of a camera based on aligned input images and a reference-input image. FIG. 5B depicts the dynamic-image-alignment system 100 generating an enhance digital image that replaces an object portrayed in a reference-input image with an object portrayed in an aligned input image. Alternatively, in some embodiments, the dynamic-image-alignment system 100 provides aligned input images to an image-editing system for the image-editing system to generate the enhanced digital images depicted in FIGS. 5A and 5B.

As indicated by FIG. 5A, for example, the dynamic-image-alignment system 100 aligns a set of input images with a reference-input image 504 and creates an enhance digital image 506. As shown, aligned input images 502a, 502b, and 502c and the reference-input image 504 are part of the set of input images comprising an object at different locations within a scene. After alignment, the dynamic-image-alignment system 100 sequences the aligned input images 502a-502c and the reference-input image 504 in an order to simulate a motion of the object. The dynamic-image-alignment system 100 then averages or blends pixels within the aligned input images 502a-502c and the reference-input image 504 to create a pixel blur within the enhanced digital image 506. As shown in FIG. 5A, the enhance digital image 506 includes a pixel blur from the aligned input images 502a-502c and the reference-input image 504 that simulates an extended exposure of a camera.

As shown in FIG. 5B, the dynamic-image-alignment system 100 identifies a reference region 514 comprising a reference instance of a person within a reference-input image 512. The dynamic-image-alignment system 100 further identifies a target region 510 comprising a target instance of the person within a target-input image 508. In some cases, the dynamic-image-alignment system 100 identifies the reference region 514 and the target region 510 based user input or aesthetic ratings (e.g., aesthetic ratings for instances of the person within the reference-input image 512 and the target-input image 508). Although not shown in FIG. 5B, the dynamic-image-alignment system 100 optionally determines a replacement region that has a boundary passing through consistent pixels in both the reference-input image 512 and the target-input image 508.

The dynamic-image-alignment system 100 subsequently generates an enhanced digital image 516 by replacing the reference region 514 from the reference-input image 512 with the target region 510 from the target-input image 508. For instance, in some embodiments, the generates the enhance digital image 516 by replacing the reference region 514 corresponding to the replacement region from the reference-input image 512 with the target region 510 corresponding to the replacement region from the target-input image 508.

Figure 6:
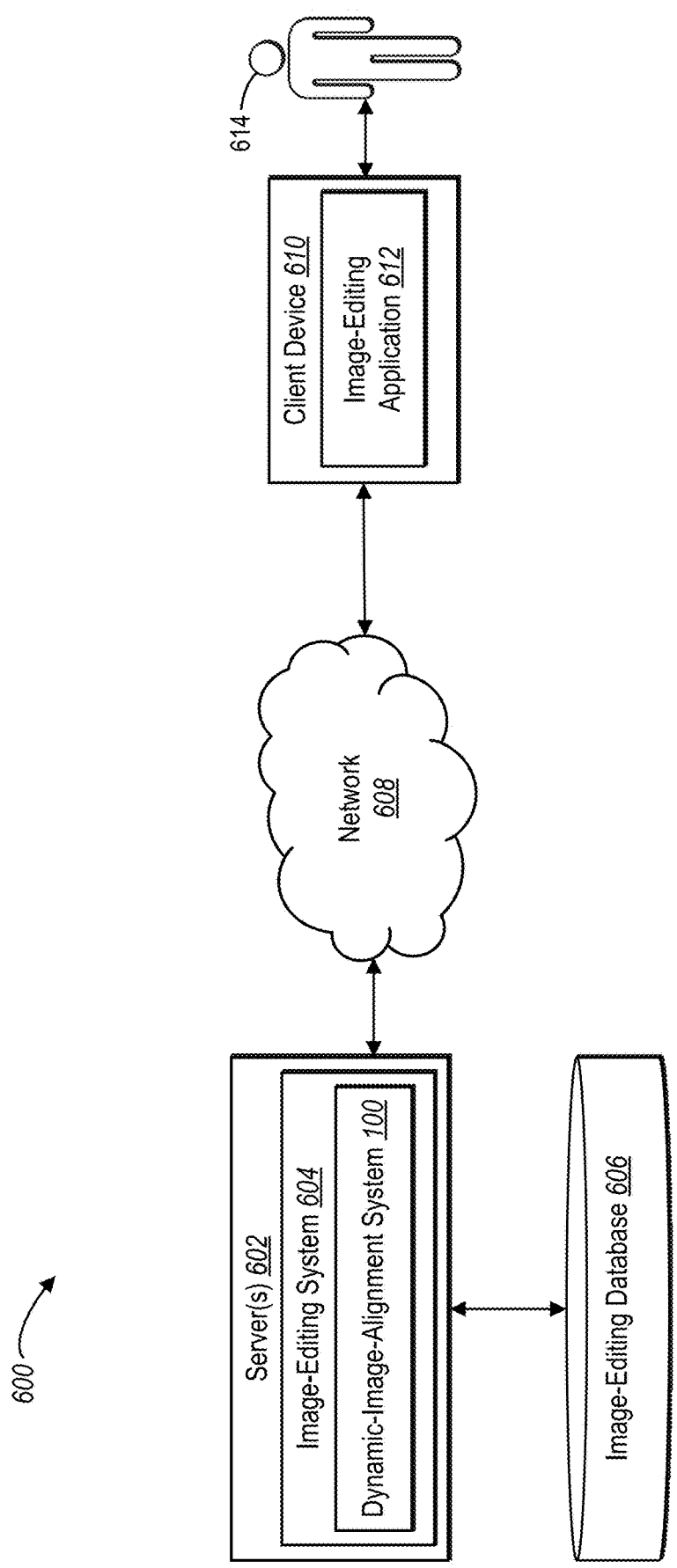
FIG. 6 illustrates a block diagram of an environment in which a dynamic-image-alignment system can operate in accordance with one or more embodiments.
Figure 7:
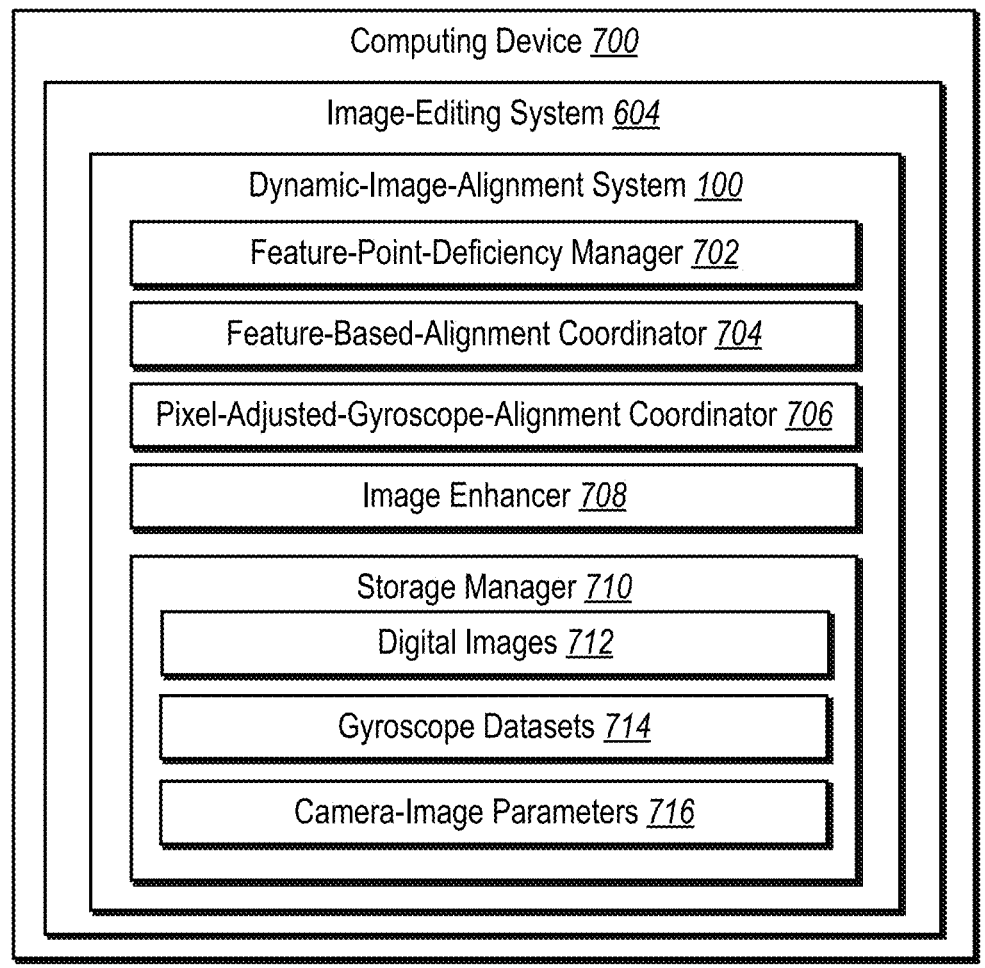
FIG. 7 illustrates a schematic diagram of the dynamic-image-alignment system of FIG. 6 in accordance with one or more embodiments.

Turning now to FIGS. 6 and 7, these figures provide an overview of an environment in which a dynamic-image-alignment system can operate and an example of an architecture for the dynamic-image-alignment system 100. FIG. 6 is a block diagram illustrating an environment 600 in which the dynamic-image-alignment system 100 can operate in accordance with one or more embodiments. As illustrated in FIG. 6, the environment 600 includes server(s) 602; a client device 610; a user 614; and a network 608, such as the Internet. The server(s) 602 can host an image-editing system 604 that includes the dynamic-image-alignment system 100. In general, the image-editing system 604 facilitates the creation, modification, aligning, sharing, accessing, storing, and/or deletion of digital images (e.g., a set of input images comprising a reference-input image). As shown in FIG. 6, the image-editing system 604 can also include the dynamic-image-alignment system 100.

Although FIG. 6 illustrates an arrangement of the server(s) 602, the client device 610, and the network 608, various additional arrangements are possible. For example, the client device 610 may directly communicate with the server(s) 602 and thereby bypass the network 608. Alternatively, in certain embodiments, the client device 610 includes all (or a portion) of the dynamic-image-alignment system 100. Indeed, the client device 610 may include the dynamic-image-alignment system 100 and perform all of the functions, methods, and processes of the dynamic-image-alignment system described above. For explanatory purposes only, the following paragraphs describe the server(s) 602 as including the dynamic-image-alignment system 100.

As further illustrated in FIG. 6, the client device 610 communicates through the network 608 with the dynamic-image-alignment system 100 via the server(s) 602. Accordingly, the user 614 can access one or more digital images, gyroscope datasets, or software applications provided (in whole or in part) by the dynamic-image-alignment system 100, including to download an image-editing application 612. Additionally, in some embodiments, third party server(s) (not shown) provide data to the server(s) 602 that enable the dynamic-image-alignment system 100 to access, download, or upload digital images, feature points, or gyroscope datasets via the server(s) 602.

As also shown in FIG. 6, in some embodiments, the dynamic-image-alignment system 100 accesses, manages, analyzes, and queries data corresponding to digital images, such as when identifying a set of feature points within a reference-input image or within an input image. For example, the dynamic-image-alignment system 100 accesses and analyzes digital images that are stored within an image-editing database 606. In some such embodiments, upon analyzing a reference-input image and an input image, the dynamic-image-alignment system 100 implements either a pixel-adjusted-gyroscope-alignment model or a feature-based-alignment model to align the input image with the reference-input image.

In certain embodiments, the user 614 interacts with the image-editing application 612 on the client device 610 to access the dynamic-image-alignment system 100. In some embodiments, the image-editing application 612 comprises a web browser, applet, or other software application (e.g., native application) available to the client device 610. Additionally, in some instances, the image-editing application 612 is integrated within an application or webpage. While FIG. 6 illustrates one client device and one user, in alternative embodiments, the environment 600 includes more than the client device 610 and the user 614. For example, in other embodiments, the environment 600 includes hundreds, thousands, millions, or billions of users and corresponding client devices.

In one or more embodiments, the client device 610 transmits data corresponding to digital images, feature points, or gyroscope datasets through the network 608 to the dynamic-image-alignment system 100. For instance, the client device 610 can download digital images, feature points, or gyroscope datasets; download software applications; or upload digital images, feature points, or gyroscope datasets. To generate the transmitted data or initiate communications, the user 614 interacts with the client device 610. The client device 610 may include, but is not limited to, mobile devices (e.g., smartphones, tablets), laptops, desktops, or any other type of computing device, such as those described below in relation to FIG. 10. Similarly, the network 608 may comprise any of the networks described below in relation to FIG. 10.

For example, in some embodiments, the server(s) 602 identify a first set of feature points within a reference-input image and a second set of feature points within an input image. Based on one or both of the first and second sets of feature points, the server(s) 602 further determine a feature-point-deficiency metric corresponding to a feature-based-alignment model for aligning the input image with the reference-input image. Based on the feature-point-deficiency metric, the server(s) 602 subsequently select an image-alignment model from a pixel-adjusted-gyroscope-alignment model and the feature-based-alignment model and apply the selected image-alignment model to the input image to align the input image with the reference-input image. In some such embodiments, the server(s) 602 further generate an enhanced digital image based on an input image aligned with a reference-input image.

In particular, in some embodiments, the server(s) 602 identify a first gyroscope dataset corresponding to a reference-input image and a second gyroscope dataset corresponding to an input image. Based on the first and second gyroscope datasets, the server(s) 602 generate gyroscope-alignment parameters for aligning the input image with the reference-input image. In some implementations, the server(s) 602 further detect a feature-point deficiency corresponding to a feature-based-alignment model based on one or both of a first set of feature points within the reference-input image and a second set of feature points within the input image. Upon (or without) detecting the feature-point deficiency, in some embodiments, the server(s) 602 generate pixel-adjusted-gyroscope-alignment parameters for aligning the input image with the reference-input image based on the gyroscope-alignment parameters and comparing pixels between the reference-input image and the input image. The server(s) 602 subsequently apply the pixel-adjusted-gyroscope-alignment parameters to the input image to align the input image with the reference-input image.

As also illustrated in FIG. 6, the image-editing system 604 is communicatively coupled to the image-editing database 606. In one or more embodiments, the image-editing system 604 accesses and queries data from the image-editing database 606 associated with requests from the dynamic-image-alignment system 100. For instance, the image-editing system 604 may access digital images, feature points, or gyroscope datasets for the dynamic-image-alignment system 100. As shown in FIG. 6, the image-editing database 606 is separately maintained from the server(s) 602. Alternatively, in one or more embodiments, the image-editing system 604 and the image-editing database 606 comprise a single combined system or subsystem within the server(s) 602.

Turning now to FIG. 7, this figure provides additional detail regarding components and features of the dynamic-image-alignment system 100. In particular, FIG. 7 illustrates a computing device 700 implementing the image-editing system 604 and the dynamic-image-alignment system 100. In some embodiments, the computing device 700 comprises one or more servers (e.g., the server(s) 602). In other embodiments, the computing device 700 comprises one or more client devices (e.g., the client device 610).

As shown in FIG. 7, the computing device 700 includes the image-editing system 604. In some embodiments, the image-editing system 604 uses its components to generate enhanced digital images based on one or more input images aligned with a reference-input image. Additionally, in some cases, the image-editing system 604 facilitates the creation, modification, aligning, sharing, accessing, storing, and/or deletion of digital images (e.g., a set of input images comprising a reference-input image).

As further shown in FIG. 7, the computing device 700 includes the dynamic-image-alignment system 100. The dynamic-image-alignment system 100 includes, but is not limited to, a feature-point-deficiency manager 702, a feature-based-alignment coordinator 704, a pixel-adjusted-gyroscope-alignment coordinator 706, an image enhancer 708, and/or a storage manager 710. The following paragraphs describe each of these components in turn.

The feature-point-deficiency manager 702 determines one or more feature-point-deficiency metrics corresponding to a feature-based-alignment model and compares one or more feature-point-deficiency metrics to one or more corresponding deficiency thresholds. For example, in some embodiments, the feature-point-deficiency manager 702 determines whether each of a first set of feature points and a second set of feature points satisfy a threshold amount of feature points. In certain implementations, the feature-point-deficiency manager 702 determines whether a filtered set of matching feature points (or a set of matching feature points) satisfies a threshold amount of matching feature points. In some cases, the feature-point-deficiency manager 702 determines whether feature-alignment parameters would reasonably align an input image with a reference-input image.

As further shown in FIG. 7, the feature-based-alignment coordinator 704 implements a feature-based-alignment model to align one or more input images with a reference-input image. For instance, in some embodiments, the feature-based-alignment coordinator 704 identifies a first set of feature points within a reference-input image and a second set of feature points within an input image. The feature-based-alignment coordinator 704 further matches feature points between the reference-input image and the input image to create matching feature points. In some embodiments, the feature-based-alignment coordinator 704 removes or filters out a subset of the matching feature points based on the gyroscope-alignment parameters to create a filtered set of matching feature points between the input image and the reference-input image. Based on the matching feature points or the filtered set of matching feature points, the feature-based-alignment coordinator 704 estimates feature-alignment parameters corresponding to the feature-based-alignment model and applies the feature-alignment parameters to the input image.

As further shown in FIG. 7, the pixel-adjusted-gyroscope-alignment coordinator 706 implements a pixel-adjusted-gyroscope-alignment model to align one or more input images with a reference-input image. For example, in some embodiments, the pixel-adjusted-gyroscope-alignment coordinator 706 identifies a first gyroscope dataset corresponding to a reference-input image and a second gyroscope dataset corresponding to an input image. Based on the first gyroscope dataset and the second gyroscope dataset, the pixel-adjusted-gyroscope-alignment coordinator 706 generates gyroscope-alignment parameters for aligning the input image with the reference-input image. The pixel-adjusted-gyroscope-alignment coordinator 706 further generates pixel-adjusted-gyroscope-alignment parameters based on the gyroscope-alignment parameters and pixel-based-alignment parameters. The pixel-adjusted-gyroscope-alignment coordinator 706 further applies the pixel-adjusted-gyroscope-alignment parameters to the input image to align the input image with the reference-input image.

As further shown in FIG. 7, the image enhancer 708 generates enhanced digital images based on one or more input images aligned with a reference-input image. For example, in some embodiments, the image enhancer 708 replaces an object portrayed in a reference-input image with an object portrayed in an aligned input image to generate an enhanced digital image. By contrast, in some cases, the image enhancer 708 generates a pixel blur based on the aligned input image and the reference-input image to simulate an extended exposure of a camera in an enhanced digital image.

As also shown in FIG. 7, the dynamic-image-alignment system 100 includes the storage manager 710. In certain embodiments, the storage manager 710 includes non-transitory computer readable media. Among other things, the storage manager 710 maintains digital images 712, gyroscope datasets 714, and/or camera-image parameters 716. In certain cases, the digital images 712 comprise one or more input images and a corresponding reference-input image (e.g., a set of input images comprising a reference-input image). Additionally, or alternatively, in certain implementations, the digital images 712 comprise aligned input images that the dynamic-image-alignment system 100 aligned with a reference-input image. Further, in some cases, the digital images 712 comprise enhanced digital images generated by the image enhancer 708.

Relatedly, in some embodiments, the gyroscope datasets 714 comprise gyroscope datasets corresponding to one or more input images and to one or more reference-input images. By contrast, in certain cases, the camera-image parameters 716 comprise focal lengths and/or image dimensions, such as the height and width of digital images, principal point-offset for a camera, and/or an axis skew.

Furthermore, in some implementations, the feature-based-alignment coordinator 704, the pixel-adjusted-gyroscope-alignment coordinator 706, and/or the image enhancer 708 communicate with the storage manager 710 to access such data files. For example, the feature-point-deficiency manager 702 can access one or more of the digital images 712 or the gyroscope datasets 714 maintained by the storage manager 710. Relatedly, in certain embodiments, the feature-based-alignment coordinator 704 accesses one or more of the digital images 712 or the gyroscope datasets 714 maintained by the storage manager 710. Additionally, in some cases, the image enhancer 708 accesses the digital images 712 maintained by the storage manager 710.

Each of the components 702-716 of the dynamic-image-alignment system 100 can include software, hardware, or both. For example, the components 702-716 can include one or more instructions stored on a computer-readable storage medium and executable by processors of one or more computing devices, such as a client device or server device. When executed by the one or more processors, the computer-executable instructions of the dynamic-image-alignment system 100 can cause the computing device(s) to perform the methods described herein. Alternatively, the components 702-716 can include hardware, such as a special-purpose processing device to perform a certain function or group of functions. Alternatively, the components 702-716 of the dynamic-image-alignment system 100 can include a combination of computer-executable instructions and hardware.

Furthermore, the components 702-716 of the dynamic-image-alignment system 100 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-716 may be implemented as a stand-alone application, such as a desktop or mobile application. Furthermore, the components 702-716 may be implemented as one or more web-based applications hosted on a remote server. The components 702-716 may also be implemented in a suite of mobile device applications or "apps." To illustrate, the components 702-716 may be implemented in a software application, including, but not limited to, ADOBE® EXPERIENCE DESIGN®, ADOBE® CREATIVE CLOUD®, ADOBE® AFTER EFFECTS®, ADOBE® PHOTOSHOP®, or ADOBE® LIGHTROOM®. "ADOBE," "EXPERIENCE DESIGN," "CREATIVE CLOUD," "AFTER EFFECTS," "PHOTOSHOP," and "LIGHTROOM" are either registered trademarks or trademarks of Adobe Systems Incorporated in the United States and/or other countries.

Figure 8:
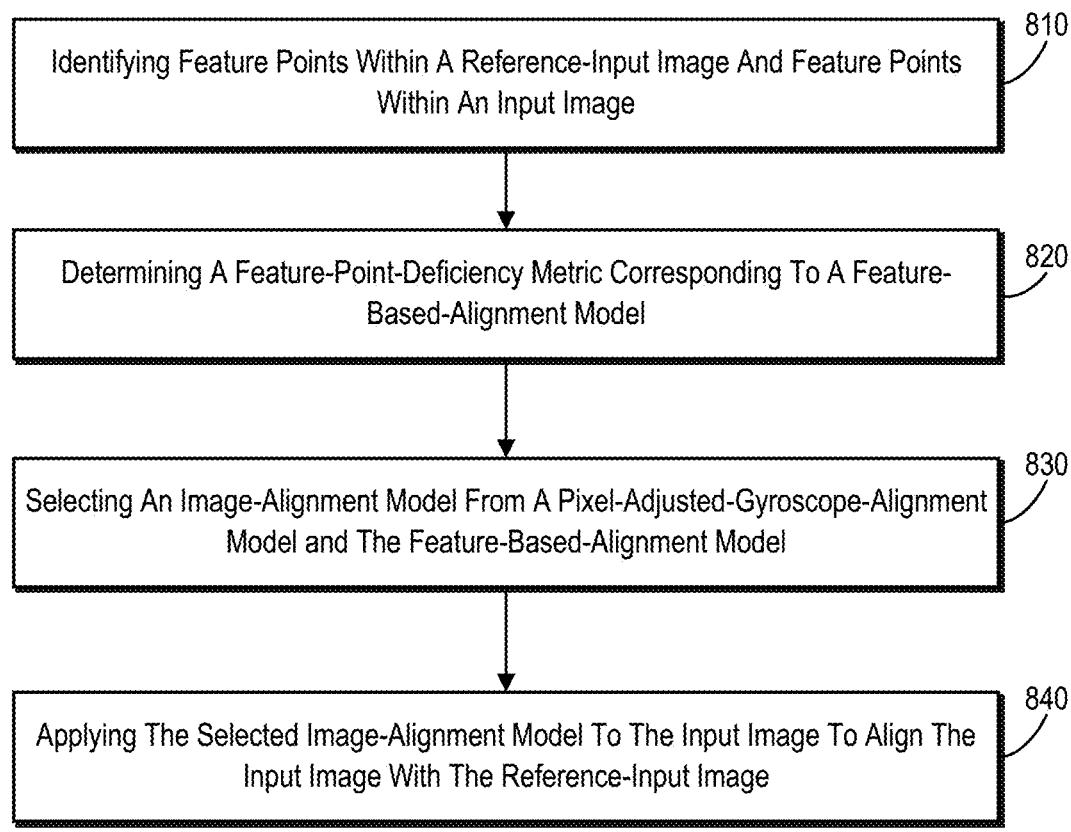
FIG. 8 illustrates a flowchart of a series of acts for selecting and applying an image-alignment model from a pixel-adjusted-gyroscope-alignment model and a feature-based-alignment model to align an input image with a reference-input image in accordance with one or more embodiments.

Turning now to FIG. 8, this figure illustrates a flowchart of a series of acts 800 of selecting and applying an image-alignment model from a pixel-adjusted-gyroscope-alignment model and a feature-based-alignment model to align an input image with a reference-input image in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of identifying feature points within a reference-input image and feature points within an input image. In particular, in some embodiments, the act 810 includes identifying a first set of feature points within a reference-input image and a second set of feature points within an input image.

As further shown in FIG. 8, the acts 800 include an act 820 of determining a feature-point-deficiency metric corresponding to a feature-based-alignment model. In particular, in some embodiments, the act 820 includes determining a feature-point-deficiency metric corresponding to a feature-based-alignment model for aligning the input image with the reference-input image based on at least one of the first set of feature points or the second set of feature points.

As suggested above, in certain embodiments, determining the feature-point-deficiency metric for the feature-based-alignment model comprises: determining a number of feature points in the first set of feature points and a number of feature points in the second set of feature points; or determining a number of matching feature points between the reference-input image and the input image.

As further shown in FIG. 8, the acts 800 include an act 830 of selecting an image-alignment model from a pixel-adjusted-gyroscope-alignment model and the feature-based-alignment model and an act 840 of applying the selected image-alignment model to the input image to align the input image with the reference-input image. For example, in certain implementations, the act 830 includes, based on the feature-point-deficiency metric, selecting an image-alignment model from a pixel-adjusted-gyroscope-alignment model and the feature-based-alignment model.

In addition to the acts 810-840, the acts 800 further include determining a feature-point deficiency by comparing the feature-point-deficiency metric to a deficiency threshold. Relatedly, in some embodiments, the acts 800 further include generating gyroscope-alignment parameters for aligning the input image with the reference-input image based on a first gyroscope dataset corresponding to the reference-input image and a second gyroscope dataset corresponding to the input image; selecting one of the pixel-adjusted-gyroscope-alignment model or the feature-based-alignment model by selecting the pixel-adjusted-gyroscope-alignment model based on detecting the feature-point deficiency corresponding to the feature-based-alignment model; generating pixel-adjusted-gyroscope-alignment parameters for aligning the input image with the reference-input image based on the gyroscope-alignment parameters and comparing pixels between the reference-input image and the input image; and applying the selected image-alignment model to the input image to align the input image with the reference-input image by applying the pixel-adjusted-gyroscope-alignment parameters to the input image to align the input image with the reference-input image.

In addition to generating pixel-adjusted-gyroscope-alignment parameters, in certain implementations, generating the pixel-adjusted-gyroscope-alignment parameters comprises: warping the input image according to the gyroscope-alignment parameters; estimating pixel-based-alignment parameters that, when applied to the input image, align the warped input image with the reference-input image; and generating the pixel-adjusted-gyroscope-alignment parameters based on both the pixel-based-alignment parameters and the gyroscope-alignment parameters.

Furthermore, in some cases, the acts 800 further include selecting one of the pixel-adjusted-gyroscope-alignment model or the feature-based-alignment model by selecting the feature-based-alignment model based on detecting an absence of feature-point deficiencies corresponding to the feature-based-alignment model; estimating feature-alignment parameters corresponding to the feature-based-alignment model for aligning the input image with the reference-input image based on the first set of feature points and the second set of feature points; and applying the selected image-alignment model to the input image to align the input image with the reference-input image by applying the feature-alignment parameters to the input image to align the input image with the reference-input image. Additionally, in some such embodiments, the feature-alignment parameters comprise one of homography-transformation parameters or affine-transformation parameters.

Additionally, in certain implementations, estimating the feature-alignment parameters comprises: generating gyroscope-alignment parameters for aligning the input image with the reference-input image based on a first gyroscope dataset corresponding to the reference-input image and a second gyroscope dataset corresponding to the input image; matching multiple feature points from the first set of feature points with multiple feature points from the second set of feature points to create matching feature points between the reference-input image and the input image; removing a subset of the matching feature points between the reference-input image and the input image based on the gyroscope-alignment parameters to create a filtered set of matching feature points between the reference-input image and the input image; and estimating the feature-alignment parameters corresponding to the feature-based-alignment model for aligning the input image with the reference-input image based on the filtered set of matching feature points between the reference-input image and the input image.

As further suggested above, in some cases, the acts 800 further include generating an enhanced digital image based on the aligned input image and the reference-input image. For example, in certain implementations, generating the enhanced digital image based on the aligned input image and the reference-input image comprises replacing an object portrayed in the reference-input image with an object portrayed in the aligned input image. As another example, in some embodiments, generating the enhanced digital image based on the aligned input image and the reference-input image comprises generating a pixel blur based on the aligned input image and the reference-input image to simulate an extended exposure of a camera.

Figure 9:
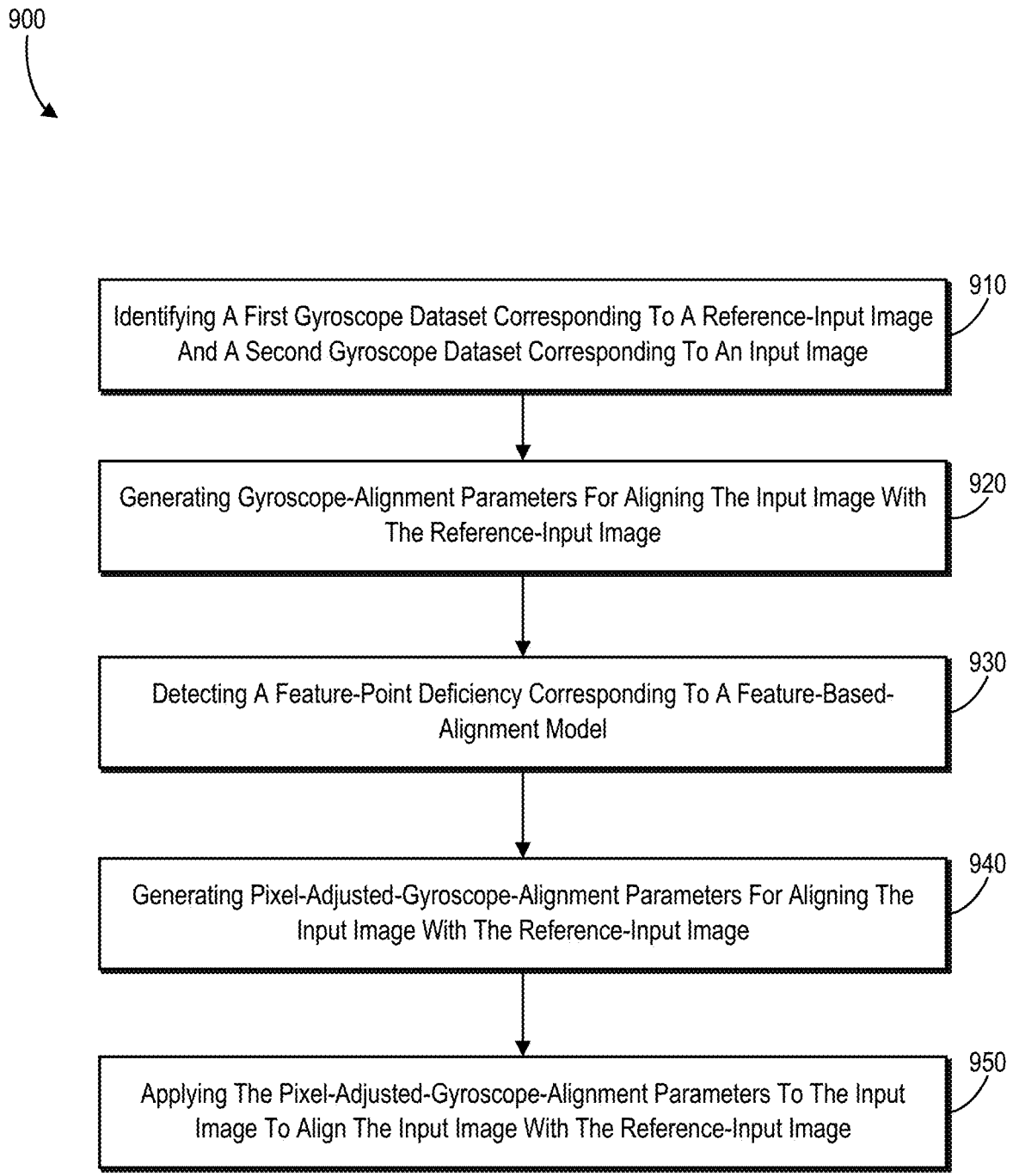
FIG. 9 illustrates a flowchart of a series of acts for generating and applying pixel-adjusted-gyroscope-alignment parameters for aligning an input image with a reference-input image in accordance with one or more embodiments.

Turning now to FIG. 9, this figure illustrates a flowchart of a series of acts 900 of generating and applying pixel-adjusted-gyroscope-alignment parameters for aligning an input image with a reference-input image in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions that, when executed by one or more processors, cause a computing device to perform the acts depicted in FIG. 9. In still further embodiments, a system can perform the acts of FIG. 9.

As shown in FIG. 9, the acts 900 include an act 910 of identifying a first gyroscope dataset corresponding to a reference-input image and a second gyroscope dataset corresponding to an input image. Further, the acts 900 include an act 920 of generating gyroscope-alignment parameters for aligning the input image with the reference-input image. For example, in some embodiments, the act 920 includes generating gyroscope-alignment parameters for aligning the input image with the reference-input image based on the first gyroscope dataset and the second gyroscope dataset. In certain implementations, the gyroscope-alignment parameters comprise gyroscope-based-homography-transformation parameters.

As suggested above, in some cases, generating the gyroscope-alignment parameters for aligning the input image with the reference-input image comprises: determining a focal length for a camera that captures the input image; determining a camera-intrinsic matrix based on the focal length and image dimensions; and generating the gyroscope-alignment parameters for aligning the input image with the reference-input image based in part on the camera-intrinsic matrix.

As further shown in FIG. 9, the acts 900 include an act 930 of detecting a feature-point deficiency corresponding to a feature-based-alignment model. For example, in certain implementations, the act 930 includes detecting a feature-point deficiency corresponding to a feature-based-alignment model for aligning the input image with the reference-input image based on at least one of a first set of feature points within the reference-input image or a second set of feature points within the input image.

As suggested above, in some embodiments, detecting the feature-point deficiency corresponding to the feature-based-alignment model by performing at least one of: determining that the first set of feature points within the reference-input image do not satisfy a threshold amount of feature points for the reference-input image; determining that the second set of feature points within the input image do not satisfy a threshold amount of feature points for the input image; determining that matching feature points between the reference-input image and the input image do not satisfy a threshold amount of matching feature points between the reference-input image and the input image; or determining that feature-alignment parameters would not align the input image with the reference-input image utilizing the feature-based-alignment model.

As further shown in FIG. 9, the acts 900 include an act 940 of generating pixel-adjusted-gyroscope-alignment parameters for aligning the input image with the reference-input image and an act 950 of applying the pixel-adjusted-gyroscope-alignment parameters to the input image to align the input image with the reference-input image. For example, in certain implementations, the act 940 includes, in response to detecting the feature-point deficiency, generating pixel-adjusted-gyroscope-alignment parameters for aligning the input image with the reference-input image based on the gyroscope-alignment parameters and comparing pixels between the reference-input image and the input image.

Relatedly, in some cases, generating the pixel-adjusted-gyroscope-alignment parameters comprises: warping the input image according to the gyroscope-alignment parameters; estimating pixel-based-alignment parameters that, when applied to the input image, align the warped input image with the reference-input image; and generating the pixel-adjusted-gyroscope-alignment parameters based on both the pixel-based-alignment parameters and the gyroscope-alignment parameters.

In addition to the acts 910-950, in some embodiments, the acts 900 further include, based on detecting the feature-point deficiency corresponding to the feature-based-alignment model, forgo applying the feature-based-alignment model for aligning the input image with the reference-input image. Additionally, in certain implementations, the acts 900 include identifying a third set of feature points within an additional reference-input image and a fourth set of feature points within an additional input image; detecting an absence of feature-point deficiencies corresponding to a feature-based-alignment model for aligning the additional input image with the additional reference-input image based on the third set of feature points within the additional reference-input image and the fourth set of feature points within the additional input image; generating feature-alignment parameters for aligning the additional input image with the additional reference-input image based on the third set of feature points within the additional reference-input image and the fourth set of feature points within the additional input image; and based on detecting the absence of feature-point deficiencies, applying the feature-alignment parameters to the additional input image to align the additional input image with the additional reference-input image.

Relatedly, in some cases, the acts 900 include determining that the third set of feature points within the additional reference-input image and the fourth set of feature points within the additional input image include a threshold amount of feature points; matching multiple feature points from the third set of feature points with multiple feature points from the fourth set of feature points to create matching feature points between the additional reference-input image and the additional input image; and removing a subset of the matching feature points between the additional reference-input image and the additional input image based on the gyroscope-alignment parameters to create a filtered set of matching feature points between the additional reference-input image and the additional input image.

Further, in certain embodiments, the acts 900 include determining that the matching feature points between the additional reference-input image and the additional input image satisfy a threshold amount of matching feature points; and estimating feature-alignment parameters corresponding to the feature-based-alignment model for aligning the additional input image with the additional reference-input image based on the filtered set of matching feature points between the additional reference-input image and the additional input image.

As further suggested above, in some cases, the acts 900 further include generating an enhanced digital image based on the aligned input image and the reference-input image. For example, in certain implementations, generating the enhanced digital image based on the aligned input image and the reference-input image comprises replacing an object portrayed in the reference-input image with an object portrayed in the aligned input image. As another example, in some embodiments, generating the enhanced digital image based on the aligned input image and the reference-input image comprises generating a pixel blur based on the aligned input image and the reference-input image to simulate an extended exposure of a camera.

In addition (or in the alternative) to the acts describe above, in some embodiments, the acts 800 (or the acts 900) include performing a step for selectively applying an image-alignment model from a pixel-adjusted-gyroscope-alignment model and a feature-based-alignment model to align the input image with the reference-input image based on the first and second gyroscope datasets and one or both of the first and second sets of feature points. For instance, the algorithm and acts 206 and 210-226 described in reference to FIG. 2 can comprise the corresponding acts for performing a step for selectively applying an image-alignment model from a pixel-adjusted-gyroscope-alignment model and a feature-based-alignment model to align the input image with the reference-input image based on the first and second gyroscope datasets and one or both of the first and second sets of feature points. Similarly, the algorithms and acts described in relation to FIGS. 3-4 can comprise the corresponding acts for performing a step for selectively applying an image-alignment model from a pixel-adjusted-gyroscope-alignment model and a feature-based-alignment model to align the input image with the reference-input image based on the first and second gyroscope datasets and one or both of the first and second sets of feature points.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 10:
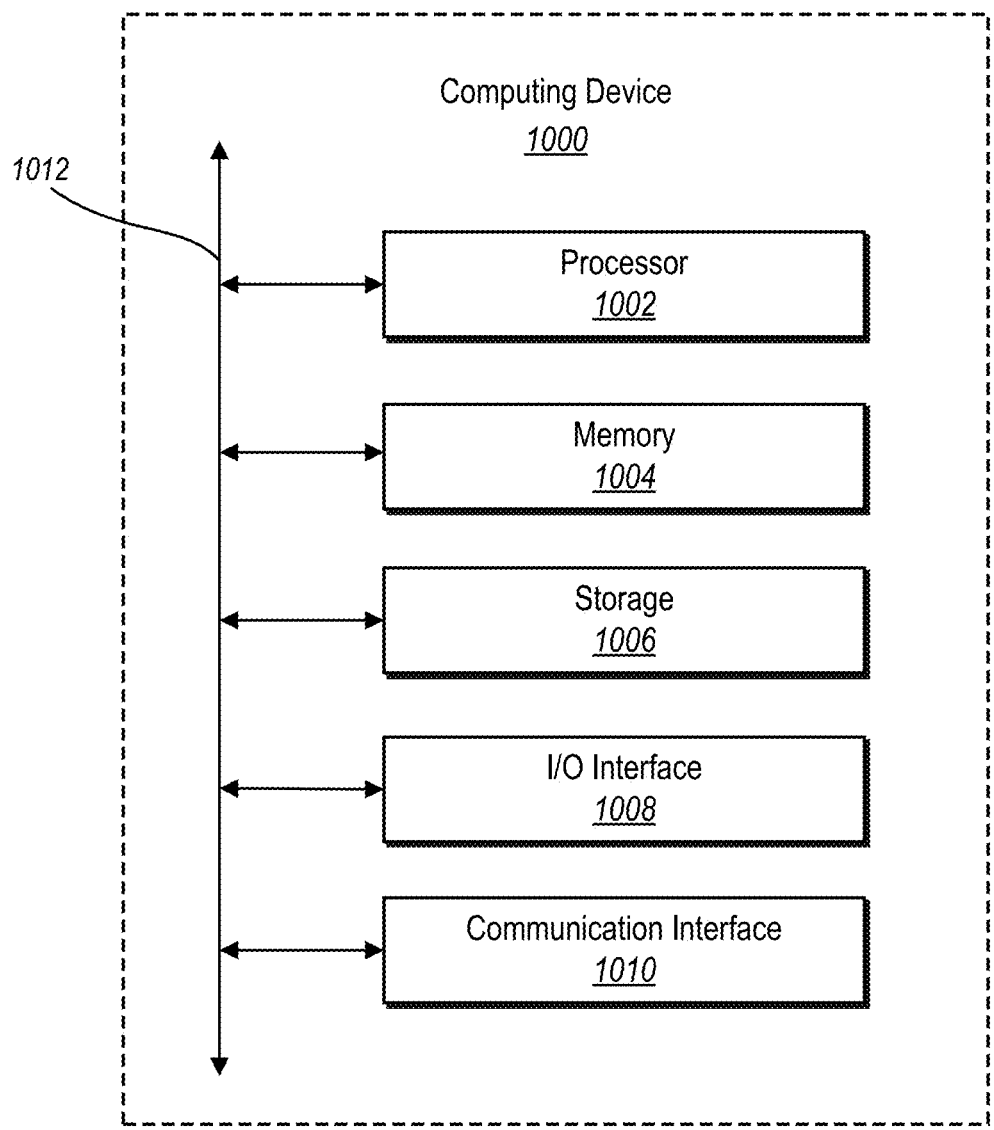
FIG. 10 illustrates a block diagram of an exemplary computing device for implementing one or more embodiments of the present disclosure.

FIG. 10 illustrates a block diagram of exemplary computing device 1000 that may be configured to perform one or more of the processes described above. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
   identifying a first set of feature points corresponding to a reference-input image captured by a camera of a computing device and a second set of feature points corresponding to an input image;
   based on the first set of feature points and the second set of feature points, selecting an image-alignment model from a feature-based-alignment model and a pixel-adjusted-gyroscope-alignment model for aligning the input image with the reference-input image; and
   aligning the input image with the reference-input image by applying the selected image-alignment model to the input image.

2. The computer-implemented method of claim 1, wherein:
   selecting the image-alignment model comprises selecting the feature-based-alignment model based on the first set of feature points and the second set of feature points; and
   aligning the input image with the reference-input image comprises aligning the input image with the reference-input image utilizing the feature-based-alignment model.

3. The computer-implemented method of claim 2, further comprising:
   generating feature-alignment parameters corresponding to the feature-based-alignment model for aligning the input image with the reference-input image based on the first set of feature points and the second set of feature points; and
   aligning the input image with the reference-input image by applying the feature-alignment parameters to the input image.

4. The computer-implemented method of claim 3, wherein generating the feature-alignment parameters comprises:
   matching multiple feature points from the first set of feature points with multiple feature points from the second set of feature points to create matching feature points between the reference-input image and the input image;
   generating a filtered set of matching feature points between the reference-input image and the input image by removing a subset of matching feature points between the reference-input image and the input image based on the first set of feature points and a first gyroscope dataset corresponding to the reference-input image and the second set of feature points and a second gyroscope dataset corresponding to the input image; and
   generating the feature-alignment parameters corresponding to the feature-based-alignment model based on the filtered set of matching feature points between the reference-input image and the input image.

5. The computer-implemented method of claim 1, wherein the input image is captured by the camera of the computing device.

6. The computer-implemented method of claim 1, wherein:
   selecting the image-alignment model comprises selecting the pixel-adjusted-gyroscope-alignment model based on the first set of feature points and the second set of feature points; and
   aligning the input image with the reference-input image comprises aligning the input image with the reference-input image utilizing the pixel-adjusted-gyroscope-alignment model.

7. The computer-implemented method of claim 6, wherein aligning the input image with the reference-input image utilizing the pixel-adjusted-gyroscope-alignment model comprises:
   generating gyroscope-alignment parameters for aligning the input image with the reference-input image based on a first gyroscope dataset corresponding to the reference-input image and a second gyroscope dataset corresponding to the input image;
   generating pixel-adjusted-gyroscope-alignment parameters for aligning the input image with the reference-input image based on the gyroscope-alignment parameters and comparing pixels between the reference-input image and the input image; and
   aligning the input image with the reference-input image by applying the pixel-adjusted-gyroscope-alignment parameters to the input image.

8. The computer-implemented method of claim 7, wherein generating the pixel-adjusted-gyroscope-alignment parameters comprises:
   warping the input image according to a homography transformation based on the gyroscope-alignment parameters;
   estimating pixel-based-alignment parameters that, when applied to the input image, align the warped input image with the reference-input image based on comparing pixels between the input image and the reference-input image; and
   generating the pixel-adjusted-gyroscope-alignment parameters based on both the pixel-based-alignment parameters and the gyroscope-alignment parameters.

9. A non-transitory computer readable storage medium comprising instructions that, when executed by at least one processor, cause a computing device to:
   identify a first set of feature points and a first gyroscope dataset corresponding to a reference-input image and a second set of feature points and a second gyroscope dataset corresponding to an input image;
   generate a filtered set of matching feature points between the reference-input image and the input image by removing a subset of matching feature points between the reference-input image and the input image based on the first set of feature points and the first gyroscope dataset corresponding to the reference-input image and the second set of feature points and the second gyroscope dataset corresponding to the input image;
   generate feature-alignment parameters for aligning the input image with the reference-input image based on the filtered set of matching feature points between the reference-input image and the input image; and
   align the input image with the reference-input image by applying the feature-alignment parameters to the input image.

10. The non-transitory computer readable storage medium of claim 9, further comprising instructions that, when executed by the at least one processor, cause the computing device to remove the subset of matching feature points that do not align the input image with the reference-input image.

11. The non-transitory computer readable storage medium of claim 9, further comprising instructions that, when executed by the at least one processor, cause the computing device to remove the subset of matching feature points by:

matching multiple feature points from the first set of feature points with multiple feature points from the second set of feature points to create matching feature points between the reference-input image and the input image; and removing the subset of the matching feature points from the matching feature points based on the first set of feature points and the first gyroscope dataset corresponding to the reference-input image and the second set of feature points and the second gyroscope dataset corresponding to the input image.

12. The non-transitory computer readable storage medium of claim 11, further comprising instructions that, when executed by the at least one processor, cause the computing device to:

generate gyroscope-alignment parameters for aligning the input image with the reference-input image based on the first gyroscope dataset corresponding to the reference-input image and the second gyroscope dataset corresponding to the input image; and removing the subset of the matching feature points from the matching feature points based on the gyroscope-alignment parameters to create the filtered set of matching feature points between the reference-input image and the input image.

13. The non-transitory computer readable storage medium of claim 9, further comprising instructions that, when executed by the at least one processor, cause the computing device to:

determine one or more of the first set of feature points corresponding to the reference-input image or the second set of feature points corresponding to the input image satisfy a threshold amount of feature points; and based on determining one or more of the first set of feature points or the second set of feature points satisfy the threshold amount of feature points, generate the feature-alignment parameters by generating homography-transformation parameters for aligning the input image with the reference-input image.

14. The non-transitory computer readable storage medium of claim 9, further comprising instructions that, when executed by the at least one processor, cause the computing device to:

determine one or more of the first set of feature points corresponding to the reference-input image or the second set of feature points corresponding to the input image do not satisfy a threshold amount of feature points; and based on determining one or more of the first set of feature points or the second set of feature points do not satisfy the threshold amount of feature points, generate the feature-alignment parameters by generating affine-transformation parameters for aligning the input image with the reference-input image.

15. The non-transitory computer readable storage medium of claim 9, further comprising instructions that, when executed by the at least one processor, cause the computing device to combine at least a portion of the input image with the reference-input image based on the aligned input image and the reference-input image.

16. A system comprising:

at least one processor; and at least one non-transitory computer memory comprising a reference-input image, an input image, and instructions that, when executed by the at least one processor, cause the system to:

identify a first set of feature points and a first gyroscope dataset corresponding to a reference-input image and a second set of feature points and a second gyroscope dataset corresponding to an input image;

generate gyroscope-alignment parameters for aligning the input image with the reference-input image based on the first gyroscope dataset and the second gyroscope dataset;

generate a filtered set of matching feature points between the reference-input image and the input image by removing a subset of matching feature points between the reference-input image and the input image based on the gyroscope-alignment parameters, the first set of feature points, and the second set of feature points;

generate feature-alignment parameters for aligning the input image with the reference-input image based on the filtered set of matching feature points between the reference-input image and the input image; and align the input image with the reference-input image by applying the feature-alignment parameters to the input image.

17. The system of claim 16, further comprising instructions that, when executed by the at least one processor, cause the system to remove the subset of matching feature points that do not align the input image with the reference-input image based on the gyroscope-alignment parameters.

18. The system of claim 16, further comprising instructions that, when executed by the at least one processor, cause the system to generate the filtered set of matching feature points between the reference-input image and the input image by removing the subset of matching feature points by:

matching multiple feature points from the first set of feature points with multiple feature points from the second set of feature points to create matching feature points between the reference-input image and the input image; and removing the subset of the matching feature points from the matching feature points based on the gyroscope-alignment parameters to create the filtered set of matching feature points between the reference-input image and the input image.

19. The system of claim 16, further comprising instructions that, when executed by the at least one processor, cause the system to:

determine the filtered set of matching feature points satisfy a threshold amount of feature points; and based on determining the filtered set of matching feature points satisfy the threshold amount of feature points, generate the feature-alignment parameters by generating homography-transformation parameters for aligning the input image with the reference-input image.

20. The system of claim 16, further comprising instructions that, when executed by the at least one processor, cause the system to:

determine the filtered set of matching feature points do not satisfy a threshold amount of feature points; and based on determining the filtered set of matching feature points do not satisfy the threshold amount of feature points, generate the feature-alignment parameters by generating affine-transformation parameters for aligning the input image with the reference-input image.

* * * * *